US012568533B2

(12) United States Patent
Geng et al.

(10) Patent No.: US 12,568,533 B2
(45) Date of Patent: Mar. 3, 2026

(54) COMMUNICATION METHOD AND COMMUNICATION APPARATUS

(71) Applicant: Huawei Technologies Co., Ltd., Shenzhen (CN)

(72) Inventors: Tingting Geng, Shanghai (CN); Chong Lou, Shanghai (CN); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 17/887,182

(22) Filed: Aug. 12, 2022

(65) Prior Publication Data

US 2022/0386389 A1 Dec. 1, 2022

Related U.S. Application Data

(63) Continuation of application No. PCT/CN2021/074676, filed on Feb. 1, 2021.

(30) Foreign Application Priority Data

Feb. 15, 2020 (CN) .......................... 202010094371.6

(51) Int. Cl.
*H04W 74/08* (2024.01)
*H04W 24/10* (2009.01)
(Continued)

(52) U.S. Cl.
CPC ....... *H04W 74/0841* (2013.01); *H04W 24/10* (2013.01); *H04W 74/0836* (2024.01);
(Continued)

(58) Field of Classification Search
CPC ..... H04W 74/08; H04W 74/00; H04W 72/04; H04W 74/04; H04W 74/06; H04W 24/10;
(Continued)

(56) References Cited

U.S. PATENT DOCUMENTS 11,350,463 B2 * 5/2022 Akkarakaran ........ H04W 76/27
11,432,324 B2 * 8/2022 Lei .................... H04W 74/0833
(Continued)

FOREIGN PATENT DOCUMENTS

CN 110583093 A 12/2019
CN 111385816 A 7/2020
(Continued)

OTHER PUBLICATIONS

CMCC: "SON Enhancement for 2-step RA", 3GPP Draft; R2-2101641,Jan. 15, 2021, XP05197 4511, total 5 pages.
(Continued)

*Primary Examiner* — Man U Phan
(74) *Attorney, Agent, or Firm* — Slater Matsil, LLP

(57) ABSTRACT

Embodiments of this application provide a communication method and a communication apparatus, and relate to the communication field. The method includes: A first network device receives a first report from a terminal device, where the first report includes first information, and the first information indicates that the terminal device passively falls back from 2-step random access to 4-step random access, or actively falls back from 2-step random access to 4-step random access. The first network device performs processing based on the first report.

19 Claims, 8 Drawing Sheets

(51) Int. Cl.
  H04W 74/0833  (2024.01)
  H04W 74/0836  (2024.01)
  *H04W 74/0838*  (2024.01)

(52) U.S. Cl.
  CPC .... H04W 74/0866 (2013.01); H04W 74/0833
    (2013.01); H04W 74/0838 (2024.01)

(58) Field of Classification Search
  CPC ..... H04W 72/12; H04W 72/14; H04W 72/23;
    H04W 76/27; H04W 52/36; H04W 52/34;
    H04W 52/14; H04W 56/00; H04W 36/00;
    H04L 5/00; H04L 5/10; H04L 1/18
  USPC ......................................................... 370/329
  See application file for complete search history.

(56)              References Cited

U.S. PATENT DOCUMENTS

| | | | | |
|---|---|---|---|---|
| 11,445,549 | B2 * | 9/2022 | Yerramalli | ............ H04W 52/34 |
| 11,653,393 | B2 * | 5/2023 | Rastegardoost | .. H04W 36/0077 |
| | | | | 370/329 |
| 11,974,325 | B2 * | 4/2024 | Lee | ........................ H04L 1/0001 |
| 12,022,523 | B2 * | 6/2024 | Wu | .................... H04W 74/0833 |
| 12,069,741 | B2 * | 8/2024 | He | ....................... H04W 56/004 |
| 12,075,490 | B2 * | 8/2024 | Khoshkholgh Dashtaki | ............... |
| | | | | H04W 72/1268 |
| 12,114,366 | B2 * | 10/2024 | Martin | .............. H04W 74/0833 |
| 2010/0331031 | A1 | 12/2010 | Chen | |
| 2014/0241285 | A1 | 8/2014 | Pang et al. | |
| 2019/0132882 | A1 | 5/2019 | Li et al. | |
| 2022/0078849 | A1 | 3/2022 | Han et al. | |
| 2022/0124828 | A1 * | 4/2022 | Uchino | ............. H04W 72/0446 |
| 2022/0150980 | A1 * | 5/2022 | Christoffersson | ........................... |
| | | | | H04W 74/0841 |
| 2022/0191945 | A1 * | 6/2022 | Yamamoto | ........ H04W 74/0833 |
| 2022/0225425 | A1 * | 7/2022 | Xing | ....................... H04L 5/008 |

FOREIGN PATENT DOCUMENTS

| | | | |
|---|---|---|---|
| EP | 3905752 | A1 | 11/2021 |
| JP | 2016506705 | A | 3/2016 |
| JP | 2023512814 | A | 3/2023 |
| WO | 2019195563 | A1 | 10/2019 |
| WO | 2020020270 | A1 | 1/2020 |
| WO | 2020134726 | A1 | 7/2020 |
| WO | 2021155743 | A1 | 8/2021 |
| WO | 2022002092 | A1 | 1/2022 |

OTHER PUBLICATIONS

Ericsson: "2-step RACH optimization for SON", 3GPP Draft; R3-210684, Jan. 14, 2021, XP051973101, total 4 pages.
Samsung: "Further Logged Information in NR MDT", 3GPP Draft; R2-1912485, Oct. 4, 2019, XP051790530, total 7 pages.
Samsung, "Further Logged Information in NR MDT", 3GPP TSG RAN WG2 #108, R2-1916095, Online meeting, Reno, NV, US, Nov. 18-22, 2019, 9 pages.
Ericsson, "Preamble group selection and 2-step failure reporting", 3GPP TSG RAN WG2 #109e, R2-2000388, Online Meeting, Elbonia, Feb. 24-Mar. 6, 2020, 7 pages.
Huawei et al., "2-step RACH and preamble transmission counters", 3GPP TSG RAN WG2 #107, R2-1910682, Online Meeting, Prague, CR, Aug. 26-30, 2019, 4 pages.
Ericsson, "On the use cases and required F1 signaling for RACH optimization at gNB-DU", 3GPP TSG RAN WG3 #106, R3-197407, Online meeting, Reno, NV, US, Nov. 8, 2019, 7 pages.
Sharp, Discussion on RACH report, 3GPP TSG-RAN WG2#108 meeting, Reno, USA, Nov. 18-22, 2019, R2-1915008, total 3 pages.

* cited by examiner

Network device 100

Cellular link

Sidelink   Terminal device 202

Terminal device 201

Network device 101

Network device 102

Terminal device 200

7205

COMMUNICATION METHOD AND COMMUNICATION APPARATUS

CROSS-REFERENCE TO RELATED APPLICATIONS

This application is a continuation of International Application No. PCT/CN2021/074676, filed on Feb. 1, 2021, which claims priority to Chinese Patent Application No. 202010094371.6, filed on Feb. 15, 2020. The disclosures of the aforementioned applications are hereby incorporated by reference in their entireties.

TECHNICAL FIELD

Embodiments of this application relate to the communication field, and in particular, to a communication method and a communication apparatus.

BACKGROUND

In long term evolution (LTE) communication or new radio (NR) communication, a terminal device may set up a connection to a network side through a random access process, and synchronize with the network side to obtain a cell radio network temporary identifier (C-RNTI). Currently, there are a 4-step random access process and a 2-step random access process. In a possible implementation, when failing to perform the 2-step random access process, the terminal device may fall back to the 4-step random access process. Currently, the network side cannot optimize configuration of the 2-step random access process. Consequently, the terminal device may frequently fall back to the 4-step random access process, and a success rate of random access of the terminal device is reduced.

SUMMARY

Embodiments of this application provide a communication method and a communication apparatus, to minimize a possibility that a terminal device falls back to 4-step random access, and improve a success rate of random access of the terminal device.

According to a first aspect, a communication method is provided, and includes: A first network device receives a first report from a terminal device, where the first report includes first information, and the first information indicates that the terminal device passively falls back from 2-step random access to 4-step random access, or actively falls back from 2-step random access to 4-step random access; the first information indicates a manner in which the terminal device falls back from 2-step random access to 4-step random access; the first information indicates whether the terminal device falls back from 2-step random access to 4-step random access; or the first information indicates whether the terminal device receives a fallback indication. The first network device may further perform processing based on the first report.

In this embodiment of this application, a network side may adjust corresponding configuration information based on the fallback manner of the terminal device, to improve a success rate of random access of the terminal device, and avoid, as much as possible, frequent 2-step random access fallback caused by inappropriate configuration on the network side. For example, when the first information indicates that the terminal device performs active fallback, a 2-step random access configuration parameter may be adjusted, to reduce a quantity of fallback times of the terminal device. For example, a maximum quantity of times for transmitting a random access preamble or msgA in a 2-step random access process is increased. The terminal device may attempt to send msgA for a plurality of times to initiate 2-step random access, so that the success rate of random access is improved. Alternatively, when the first information indicates that the terminal device performs passive fallback, the network side may adjust a time-frequency resource of 2-step random access, and allocate, to the terminal device, sufficient time-frequency resources for transmitting data (for example, msgA) related to 2-step random access, to improve the success rate of random access.

With reference to the first aspect, in a first possible implementation of the first aspect, the first report further includes second information, and the second information indicates a quality threshold of 2-step random access.

The second information is used by the network device to determine the quality threshold of 2-step random access, so that the quality threshold of 2-step random access can be increased, and the terminal device is enabled to select 4-step random access as much as possible. The terminal device is prevented, to some extent, from frequently falling back to a 4-step random access process, to improve a success rate of random access of the terminal device.

With reference to the first aspect or the first possible implementation of the first aspect, in a second possible implementation of the first aspect, the first report further includes third information, and the third information includes at least one of the following information: information about a physical uplink shared channel PUSCH configured for the terminal device in 2-step random access, random access configuration information in 2-step random access, and a correspondence between the random access configuration information and the PUSCH.

The third information is used by the network device to determine 2-step random access configuration information. After receiving the first report, the network device may optimize the 2-step random access configuration information, to avoid, as much as possible, a 2-step random access failure of the terminal device caused by inappropriate configuration, and improve a success rate of random access of the terminal device.

With reference to the first aspect or the first or second possible implementation of the first aspect, in a third possible implementation of the first aspect, the first report further includes fourth information, and the fourth information indicates time information for the terminal device to fall back to 4-step random access.

The fourth information is used by the network device to determine 2-step random access configuration information that causes current 2-step random access fallback, so that the 2-step random access configuration information is adjusted, a success rate of performing 2-step random access by the terminal device is improved, and the terminal device is prevented, to some extent, from frequently falling back to 4-step random access.

With reference to any one of the first aspect or the first to third possible implementations of the first aspect, in a fourth possible implementation of the first aspect, the first report further includes fifth information, and the fifth information indicates cell information for the terminal device to perform 2-step random access.

The fifth information is used by the network device to determine, based on the fifth information, a network device corresponding to the first report, and forward a part or all of information in the first report to the network device.

With reference to any one of the first aspect or the first to fourth possible implementations of the first aspect, in a fifth possible implementation of the first aspect, the first report further includes sixth information, and the sixth information indicates at least one of the following information: a network type of a first cell, a frequency type of the first cell, a service type of the first cell, and a type of the first cell, where the first cell is a cell in which the terminal device performs 2-step random access.

The sixth information is used by the network device to determine a feature of the cell in which the terminal device performs 2-step random access, so that 2-step random access configuration information is optimized based on the feature of the cell, and a success rate of random access of the terminal device is improved.

With reference to any one of the first aspect or the first to fifth possible implementations of the first aspect, in a sixth possible implementation of the first aspect, that the first network device performs processing based on the first report includes: The first network device sends a part or all of information in the first report to a second network device.

In this embodiment of this application, the first network device sends, to a network device corresponding to the first report, that is, a network device that the terminal device performs 2-step random access, information related to 2-step random access in the first report, so that the network device optimizes 2-step random access configuration information, to improve a success rate of random access of the terminal device.

With reference to the sixth possible implementation of the first aspect, in a seventh possible implementation of the first aspect, the first network device is a centralized unit CU, and the second network device is a distributed unit DU; or the first network device and the second network device are different base stations.

In this embodiment of this application, transmission that is of information related to 2-step random access and that is between the base stations is supported, and transmission that is of the information related to 2-step random access and that is between the CU and the DU is further supported. In the foregoing scenario, 2-step random access configuration information may be optimized, thereby improving a success rate of random access of the terminal device.

According to a second aspect, a communication method is provided, and includes: A terminal device determines first information, where the first information indicates that the terminal device passively falls back from 2-step random access to 4-step random access, or actively falls back from 2-step random access to 4-step random access. The terminal device sends a first report to a first network device, where the first report includes the first information.

With reference to the second aspect, in a first possible implementation of the second aspect, the first report further includes second information, and the second information indicates a quality threshold of 2-step random access.

With reference to the second aspect or the first possible implementation of the second aspect, in a second possible implementation of the second aspect, the first report further includes third information, and the third information includes at least one of the following information: information about a physical uplink shared channel PUSCH configured for the terminal device in 2-step random access, random access configuration information in 2-step random access, and a correspondence between the random access configuration information and the PUSCH.

With reference to the second aspect or the first or second possible implementation of the second aspect, in a third possible implementation of the second aspect, the first report further includes fourth information, and the fourth information indicates time information for the terminal device to fall back to 4-step random access.

With reference to any one of the second aspect or the first to third possible implementations of the second aspect, in a fourth possible implementation of the second aspect, the first report further includes fifth information, and the fifth information indicates cell information for the terminal device to perform performs 2-step random access.

With reference to any one of the second aspect or the first to fourth possible implementations of the second aspect, in a fifth possible implementation of the second aspect, the first report further includes sixth information, and the sixth information indicates at least one of the following information: a network type of a first cell, a frequency type of the first cell, a service type of the first cell, and a type of the first cell, where the first cell is a cell in which the terminal device performs 2-step random access.

According to a third aspect, a first communication apparatus is provided, and includes: a communication unit, configured to receive a first report from a terminal device, where the first report includes first information, and the first information indicates that the terminal device passively falls back from 2-step random access to 4-step random access, or actively falls back from 2-step random access to 4-step random access; and a processing unit, configured to perform processing based on the first report.

With reference to the third aspect, in a first possible implementation of the third aspect, the first report further includes second information, and the second information indicates a quality threshold of 2-step random access.

With reference to the third aspect or the first or second possible implementation of the third aspect, in a third possible implementation of the third aspect, the first report further includes third information, and the third information includes at least one of the following information: information about a physical uplink shared channel PUSCH configured for the terminal device in 2-step random access, random access configuration information in 2-step random access, and a correspondence between the random access configuration information and the PUSCH.

With reference to any one of the third or the first to third possible implementations of the third aspect, in a fourth possible implementation of the third aspect, the first report further includes fourth information, and the fourth information indicates time information for the terminal device to fall back to 4-step random access.

With reference to any one of the third aspect or the first to fourth possible implementations of the third aspect, in a fifth implementation of the third aspect, the first report further includes fifth information, and the fifth information indicates cell information for the terminal device to perform 2-step random access.

With reference to any one of the third aspect or the first to fifth possible implementations of the third aspect, in a sixth possible implementation of the third aspect, the first report further includes sixth information, and the sixth information indicates at least one of the following information: a network type of a first cell, a frequency type of the first cell, a service type of the first cell, and a type of the first cell, where the first cell is a cell in which the terminal device performs 2-step random access.

With reference to any one of the third aspect or the first to sixth possible implementations of the third aspect, in a seventh possible implementation of the third aspect, the processing unit is specifically configured to send a part or all of information in the first report to a second communication apparatus by using the communication unit.

With reference to the seventh possible implementation of the third aspect, in an eighth possible implementation of the third aspect, the first communication apparatus is a centralized unit CU, and the second communication apparatus is a distributed unit DU; or the first communication apparatus and the second communication apparatus are different base stations.

According to a fourth aspect, a communication apparatus is provided, and includes: a processing unit, configured to determine first information, where the first information indicates that a terminal device passively falls back from 2-step random access to 4-step random access, or actively falls back from 2-step random access to 4-step random access; and a communication unit, configured to send a first report to a first network device, where the first report includes the first information.

With reference to the fourth aspect, in a first possible implementation of the fourth aspect, the first report further includes second information, and the second information indicates a quality threshold of 2-step random access.

With reference to the fourth aspect or the first possible implementation of the fourth aspect, in a second possible implementation of the fourth aspect, the first report further includes third information, and the third information includes at least one of the following information: information about a physical uplink shared channel PUSCH configured for the terminal device in 2-step random access, random access configuration information in 2-step random access, and a correspondence between the random access configuration information and the PUSCH.

With reference to the fourth aspect or the first or second possible implementation of the fourth aspect, in a third possible implementation of the fourth aspect, the first report further includes fourth information, and the fourth information indicates time information for the terminal device to fall back to 4-step random access.

With reference to any one of the fourth aspect or the first to third possible implementations of the fourth aspect, in a fourth possible implementation of the fourth aspect, the first report further includes fifth information, and the fifth information indicates cell information for the terminal device to perform 2-step random access.

With reference to any one of the fourth aspect or the first to fourth possible implementations of the fourth aspect, in a fifth possible implementation of the fourth aspect, the first report further includes sixth information, and the sixth information indicates at least one of the following information: a network type of a first cell, a frequency type of the first cell, a service type of the first cell, and a type of the first cell, where the first cell is a cell in which the terminal device performs 2-step random access.

According to a fifth aspect, a communication apparatus is provided, and includes at least one processor and a memory, where the at least one processor is coupled to the memory, and the memory is configured to store a computer program.

The at least one processor is configured to execute the computer program stored in the memory, to enable the apparatus to perform the method according to the first aspect and any one of the implementations of the first aspect, or the method according to the second aspect and any one of the implementations of the second aspect.

According to a sixth aspect, a computer-readable storage medium is provided. The computer-readable storage medium stores instructions; and when the computer-readable storage medium is run on the communication apparatus according to the third aspect and any one of the implementations of the third aspect, the communication apparatus is enabled to perform the communication method according to the first aspect and any one of the implementations of the first aspect.

According to a seventh aspect, a computer-readable storage medium is provided. The computer-readable storage medium stores instructions; and when the computer-readable storage medium is run on the communication apparatus according to the fourth aspect and any one of the implementations of the fourth aspect, the communication apparatus is enabled to perform the communication method according to the second aspect and any one of the implementations of the second aspect.

According to an eighth aspect, a wireless communication apparatus is provided. The communication apparatus includes a processor, for example, used in the communication apparatus, to implement the method according to the first aspect and any one of the implementations of the first aspect. The communication apparatus may be, for example, a chip system. In a feasible implementation, the chip system further includes a memory, and the memory is configured to store program instructions and data that are necessary for implementing the functions of the method according to the first aspect.

According to a ninth aspect, a wireless communication apparatus is provided. The communication apparatus includes a processor, for example, used in the communication apparatus, to implement the function or the method according to the second aspect and any one of the implementations of the second aspect. The communication apparatus may be, for example, a chip system. In a feasible implementation, the chip system further includes a memory, and the memory is configured to store program instructions and data that are necessary for implementing the functions of the method according to the second aspect.

The chip system in the foregoing aspect may be a system-on-a-chip (SOC), a baseband chip, or the like. The baseband chip may include a processor, a channel encoder, a digital signal processor, a modem, an interface module, and the like.

According to a tenth aspect, a communication system is provided. The communication system includes the communication apparatus according to the third aspect, any one of the possible implementations of the third aspect, the fourth aspect, and any one of the possible implementations of the fourth aspect; or the communication apparatus according to the fifth aspect and the sixth aspect.

In a possible implementation, the communication system further includes a second network device, and the second network device is configured to: receive a part or all of information in a first report, and perform processing based on the part or all of the information about in first report.

DETAILED DESCRIPTION OF ILLUSTRATIVE EMBODIMENTS

Figure 1:
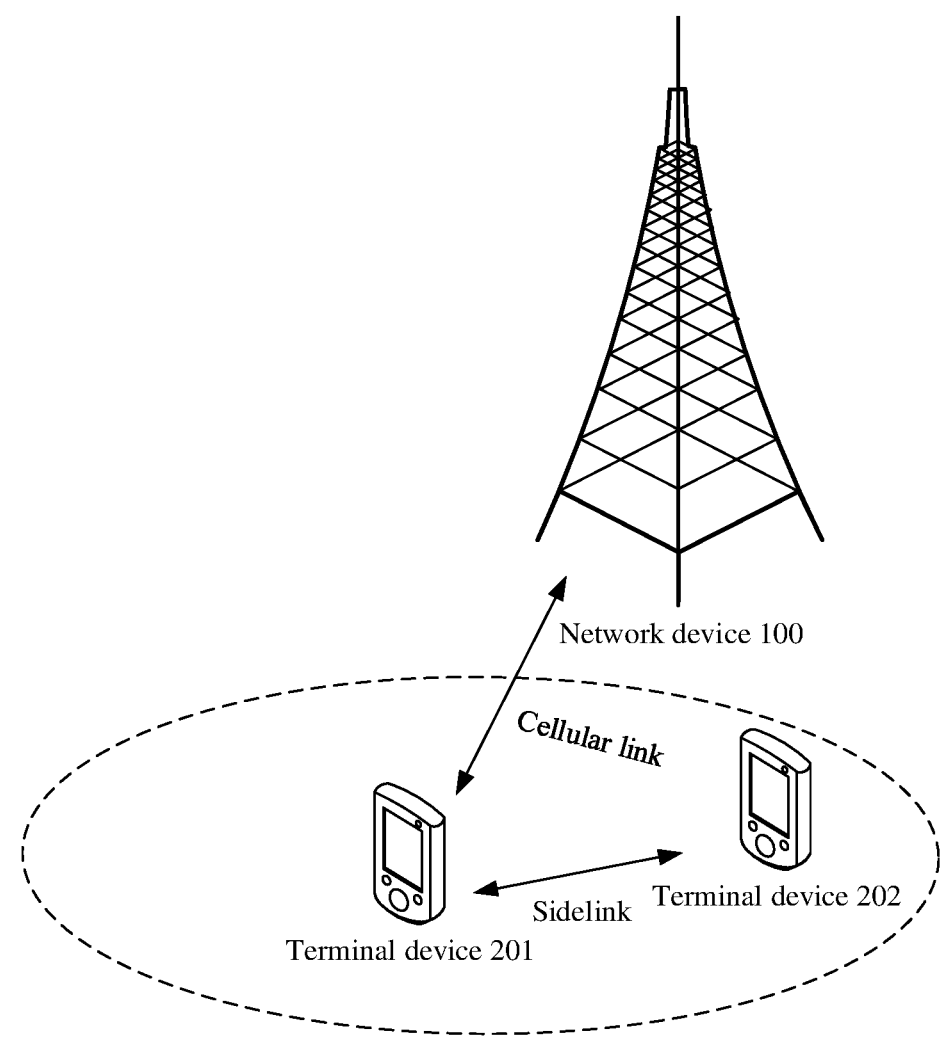
FIG. 1 is an architectural diagram of a communication system according to an embodiment of this application.

FIG. 1 is a schematic diagram of a communication system to which technical solutions provided in this application are applicable. The communication system may include at least one network device (a network device 100 is shown) and at least one terminal device (only a terminal device 201 and a terminal device 202 are shown in the figure). FIG. 1 is merely a schematic diagram, and does not constitute a limitation on an applicable scenario of the technical solutions provided in this application.

The network device 100 may be any device having a wireless transceiver function. The network device includes but is not limited to an evolved base station (E-UTRAN NodeB, e-NodeB, or eNB) in LTE, a base station (gNodeB or gNB) or a transmission/reception point (TRP) in a 5G or new radio (NR) access technology, a base station subsequently evolved in 3GPP, an access node, a wireless relay node, or a wireless backhaul node in a Wi-Fi system, or the like. The base station may be a macro base station, a micro base station, a pico base station, a small cell, a relay station, a balloon station, or the like. A plurality of base stations may support networks using a same technology mentioned above, or may support networks using different technologies mentioned above. The base station may include one or more co-site or non-co-site TRPs. Alternatively, the network device may be a radio controller, a centralized unit (CU), and/or a distributed unit (DU) in a cloud radio access network (CRAN) scenario. Alternatively, the network device may be a server, a wearable device, a vehicle-mounted device, or the like. The following provides descriptions by using an example in which the network device is a base station. The plurality of network devices may be base stations of a same type, or may be base stations of different types. The base station may communicate with the terminal device, or may communicate with the terminal device via a relay station. The terminal device may communicate with a plurality of base stations using different technologies. For example, the terminal device may communicate with a base station supporting an LTE network, or may communicate with a base station supporting a 5G network, or may support dual connections to the base station supporting the LTE network and the base station supporting the 5G network.

The terminal device (for example, a terminal device 200) is a device having a wireless transceiver function, and may be deployed on land, where the deployment includes indoor or outdoor, handheld, wearable, or vehicle-mounted deployment, may be deployed on water (for example, on a ship), or may be deployed in air (for example, on an airplane, a balloon, and a satellite). The terminal device may be a mobile phone, a tablet (Pad), a computer with a wireless transceiver function, a virtual reality (VR) terminal device, an augmented reality (AR) terminal device, a wireless terminal in industrial control, a vehicle-mounted terminal device, a wireless terminal in self-driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in embodiments of this application. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a UE agent, a UE apparatus, or the like. The terminal may be fixed or movable. The terminal device in this application may alternatively be a vehicle-mounted module, a vehicle-mounted component, an onboard component, a vehicle-mounted chip, or a vehicle-mounted unit that is built in a vehicle as one or more components or units. The vehicle uses the vehicle-mounted module, the onboard component, the vehicle-mounted component, the vehicle-mounted chip, or the vehicle-mounted unit that is built in the vehicle, to implement a method in this application.

The network device communicates with the terminal device (for example, the terminal device 202 or the terminal device 201) through a cellular link, and the terminal devices (for example, the terminal device 201 and the terminal device 202) communicate with each other through a sidelink.

Figures 2, 3:
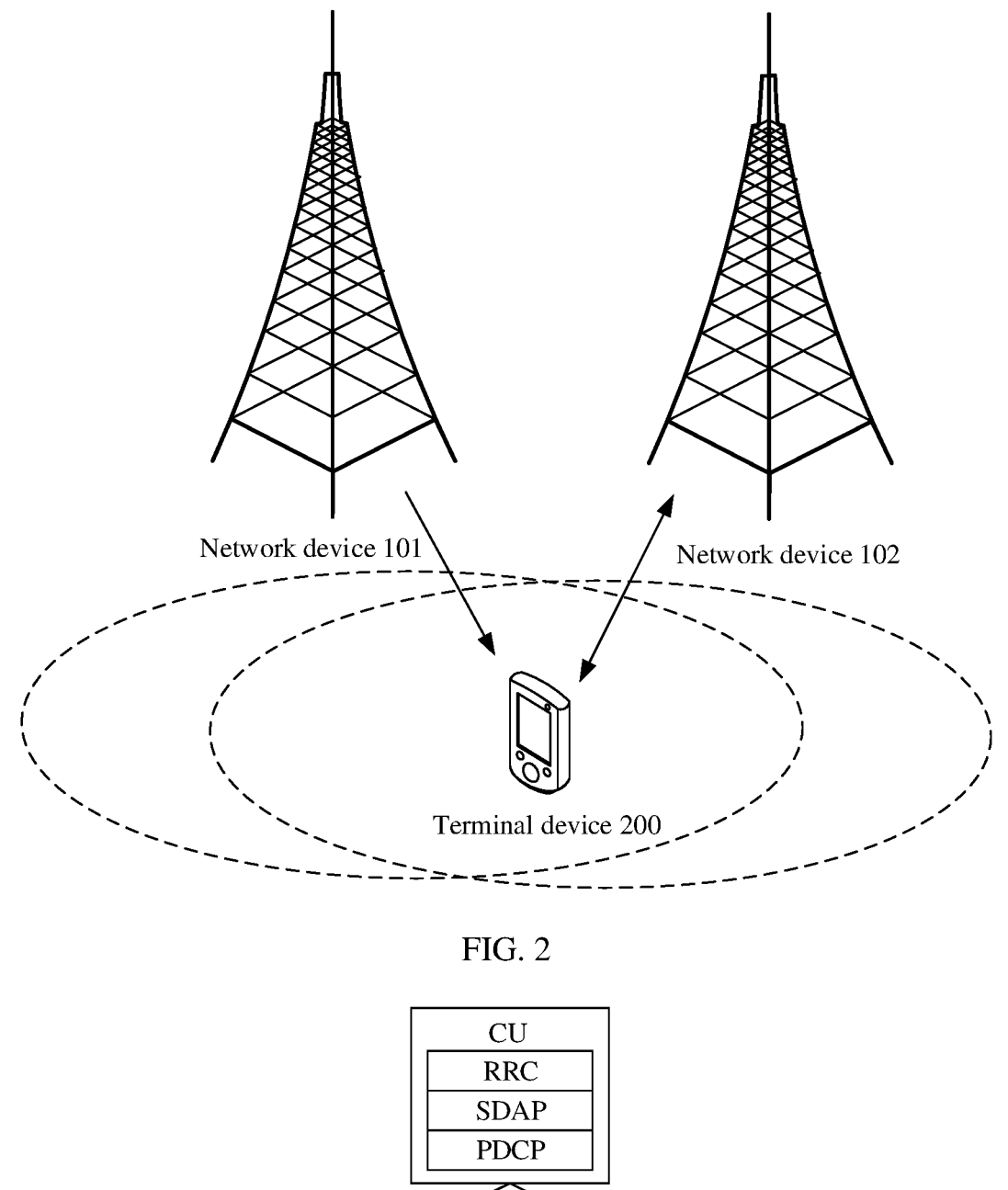
FIG. 2 is another architectural diagram of a communication system according to an embodiment of this application.
FIG. 3 is a structural block diagram of a network device according to an embodiment of this application.

FIG. 2 is another schematic diagram of a communication system applicable to an embodiment of this application. As shown in FIG. 2, the communication system may include at least two network devices, for example, a network device 101 and a network device 102 that are shown in FIG. 2. The communication system may further include at least one terminal device 200. The terminal device 200 may set up radio links to the network device 101 and the network device 102 by using a dual connectivity (DC) technology or a multi-connectivity technology. The network device 101 may be, for example, a master base station, and the network device 102 may be, for example, a secondary base station. In this case, the network device 101 is a network device that the terminal device 200 initially accesses, and is responsible for radio resource control (RRC) communication with the terminal device 200. The network device 102 may be added during RRC reconfiguration, and is configured to provide an additional radio resource.

In addition, as shown in FIG. 2, one of the two network devices, for example, the network device 101, may be responsible for exchanging an RRC message with the terminal device 200, and responsible for interacting with a core network control plane entity. In this case, the network device 101 may be referred to as a master node (MN). For example, the master node may be a master evolved NodeB (MeNB) or a master next generation node base station (MgNB), which is not limited herein. The other network device, for example, the network device 102, may be referred to as a secondary node (SN). For example, the secondary node may be a secondary evolved NodeB (SeNB) or a secondary next generation node base station (SgNB), which is not limited herein. A plurality of serving cells in the master node may form a master cell group (MCG), including one primary cell (PCell) and one or more optional secondary cells (SCells). A plurality of serving cells in the secondary node may form a secondary cell group (SCG), including one primary secondary cell (PSCell) and one or more optional SCells. The serving cell is a cell configured by a network for the terminal to perform uplink and downlink transmission.

Certainly, in FIG. 2, the network device 102 may be a master node, and the network device 101 may be a secondary node. This is not limited in this application. In addition, for ease of understanding only, the figure shows a case in which two network devices are wirelessly connected to the terminal device. Alternatively, the terminal device may have communication connections to three or more network devices at the same time, and may receive and send data. One of the three or more network devices may be responsible for exchanging an RRC message with the terminal, and responsible for interacting with the core network control plane entity. In this case, the network device may be referred to as an MN, and the other network devices may be referred to as SNs.

Refer to FIG. 3. The network device may include a centralized unit (CU) node and a distributed unit (DU) node. Optionally, the network device is a RAN device including the CU node and the DU node.

Figure 4:
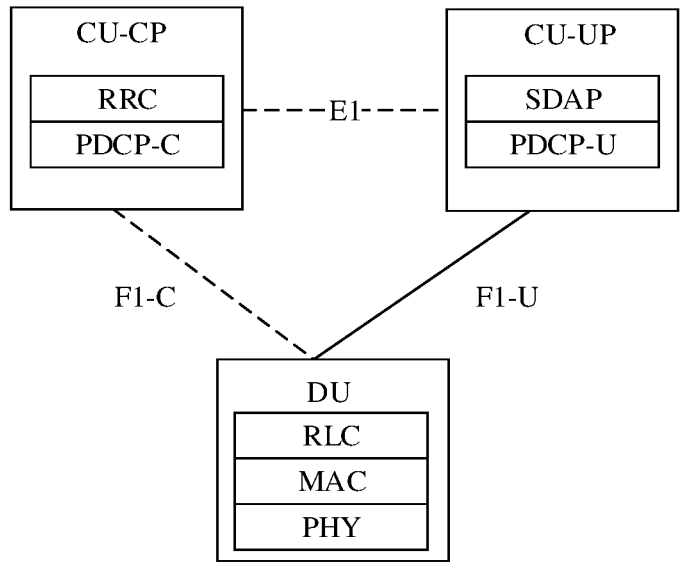
FIG. 4 is another structural block diagram of a network device according to an embodiment of this application.

Refer to FIG. 4. The CU node may be divided into a control plane (CU-CP) and a user plane (CU-UP). The CU-CP is responsible for a control plane function, and mainly includes a radio resource control (RRC) layer and a packet data convergence protocol (PDCP)-C layer. The PDCP-C layer is mainly responsible for data encryption and decryption, integrity protection, data transmission, and the like on a control plane. The CU-UP is responsible for a user plane function, and mainly includes a service data adaptation protocol (SDAP) layer and a PDCP-U layer. The SDAP layer is mainly responsible for processing data of a core network and mapping a flow to a bearer. The PDCP-U layer is mainly responsible for encryption and decryption, integrity protection, header compression, serial number maintenance, data transmission, and the like on a data plane. The CU-CP and the CU-UP are connected through an E1 interface. The CU-CP indicates that the CU is connected to the core network through an NG interface, and is connected to the DU through an F1-C (control plane) interface. The CU-UP is connected to the DU through an F1-U (user plane) interface. Certainly, in another possible implementation, the PDCP-C layer is also in the CU-UP.

Terms related to embodiments of this application are first described.

(1) Random Access

Random access is a prerequisite for communication between a terminal device and a network side. The terminal device may set up uplink synchronization through random access, obtain a C-RNTI, and request the network to allocate an uplink resource. Random access is not only used for initial access, but also used for new cell access in a handover process, access after a radio link failure, resume of uplink synchronization and an uplink resource request when there is uplink/downlink data transmission, and the like.

After completing a random access process, the terminal device may obtain data bearer configuration information, set up, based on the configuration information, a bearer used for data transmission, and perform data communication with a network device.

Depending on whether contention is based, random access may be classified into contention-based random access (CBRA) and non-contention-based random access (or contention-free-based random access, CFRA).

Based on steps in the random access process, random access may be further classified into 4-step random access (44-step RACH) and 2-step random access (2-step RACH).

In some possible implementations, the terminal device may determine, based on cell signal quality, whether to select 4-step RACH or 2-step RACH. In embodiments of this application, the cell signal quality may be represented by at least one of a received signal code power (RSCP), a reference signal received power (RSRP), reference signal received quality (RSRQ), a signal-to-noise ratio (SNR), a signal to interference plus noise ratio (SINR), a reference signal strength indication (RSSI), or other signal quality. If the cell signal quality is represented by the reference signal received power, a quality threshold of 2-step RACH may be the reference signal received power.

The RSRP is used as an example. The terminal device measures a reference signal to obtain the RSRP, and the quality threshold of 2-step RACH is an RSRP value T. When the RSRP obtained by the terminal device through measurement is less than or equal to T, the terminal device selects 4-step RACH; when the RSRP obtained by the terminal device through measurement is greater than T, the terminal device selects 2-step RACH.

(2) 4-Step Random Access Process

Figure 5:
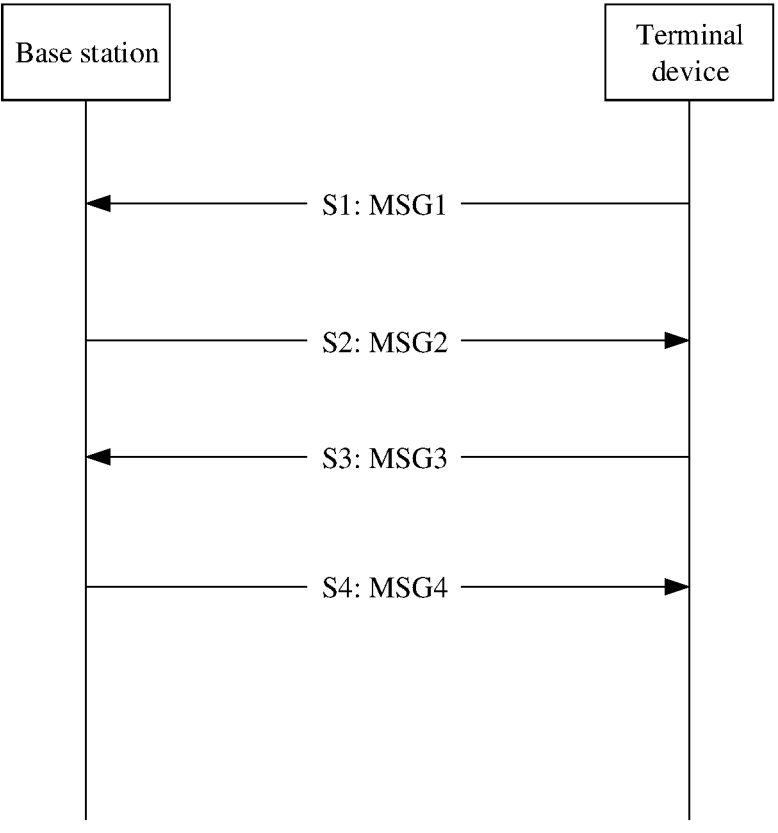
FIG. 5 is a flowchart of random access according to an embodiment of this application.

Refer to FIG. 5. An NR system is used as an example, and the 4-step random access process includes the following procedures.

S1: A terminal device sends a message 1 (MSG 1).

It should be noted that the message 1 includes a random access preamble. The terminal device receives 4-step RACH configuration information sent by a network device, for example, at least one type of configuration information such as preamble configuration information, RACH time-frequency resource configuration information, and a maximum quantity of times for transmitting the preamble. The preamble configuration information is used by the terminal device to determine the preamble. The RACH time-frequency resource configuration information is used by the terminal device to determine a RACH time-frequency resource. The RACH time-frequency resource is used by the terminal device to send the preamble.

For example, the terminal device initiates contention-based 4-step random access in a cell. The terminal device may select one preamble from available preambles of the cell, and transmit the preamble through a physical random access channel (PRACH). Alternatively, in non-contention-based 4-step random access, the terminal device transmits, through a PRACH, a preamble specified by a base station.

S2: After receiving the preamble sent by the terminal device, the base station sends a message 2 (MSG 2) to the terminal device.

It should be noted that the message 2 may be referred to as a random access response (RAR).

After sending the preamble, the terminal device monitors a physical downlink control channel (PDCCH) within a RAR time window (RA response window), to receive the corresponding RAR.

In some possible implementations, after receiving the preamble sent by the terminal device, the base station estimates a transmission delay between the base station and the terminal device, and calculates an uplink timing advance (TA) based on the transmission delay, so that the base station calibrates uplink timing. The base station may further send the TA to the terminal device, so that the terminal device performs uplink synchronization with the base station based on the TA.

In a possible implementation, the RAR includes at least one of a preamble identifier, TA information, and initial uplink grant (UL grant) information. Optionally, the RAR may further include a temporary identifier C-RNTI of the UE.

After receiving the RAR from the base station, the terminal device determines whether a preamble indicated by the preamble identifier in the RAR is the same as the preamble sent in step S1. If the preambles are the same, it is considered that the RAR is successfully received; otherwise, it is considered that the RAR fails to be received, and the terminal device may re-trigger a random access process.

Alternatively, if the terminal device does not receive, within the RAR time window, the RAR replied by the base station, it is considered that the current random access process fails.

S3: The terminal device sends a message 3 (MSG 3) to the base station.

MSG 3 includes identification information of the terminal device, and the identification information of the terminal device may be used for contention resolution in S4. The identification information of the terminal device may be any one of C-RNTI information of the terminal device, a resume identifier (resume ID) or an inactive identifier (inactive RNTI, I-RNTI) of the terminal device, a system architecture evolution temporary mobile subscriber identity (S-TMSI), or a random number. The resume ID or the I-RNTI is used by the base station to identify the terminal device, related context information, and the like.

In some possible implementations, the terminal device may determine a physical uplink shared channel (PUSCH) based on the UL grant information in the RAR, and send data through the PUSCH. That the terminal device sends the data through the PUSCH may be referred to as sending the message 3.

The data sent by the terminal device through the PUSCH may include at least one of a radio resource control (RRC) layer message and user plane data of the terminal device.

S4: The base station sends a message 4 (MSG4) to the terminal device to resolve a contention.

Specifically, the base station receives the message 3 sent by the terminal device, and may obtain the identification information of the terminal device from the message 3. The base station may send the message 4 to the terminal device, to indicate a terminal device that wins in a random access contention, and another terminal device may re-initiate random access. The message 4 may include a contention resolution identity (CR ID).

For example, the CR ID is a part or all of the identification information of the terminal device in the message 3. After receiving the message 4, the terminal device compares the CR ID with the identification information of the terminal device in the message 3. If the CR ID matches the identification information of the terminal device in the message 3, contention resolution succeeds. If the terminal device does not receive the message 4, the terminal device may re-initiate random access. Alternatively, if the CR ID does not match the identification information of the terminal device in the message 3, that is, the terminal device fails in contention resolution, the terminal device may re-initiate random access.

(3) 2-Step Random Access Process

Figure 6:
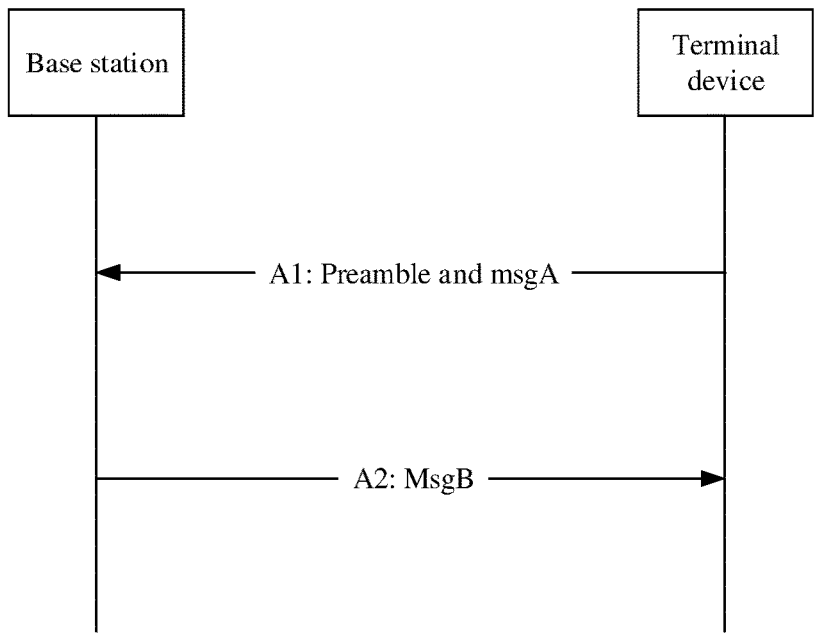
FIG. 6 is another flowchart of random access according to an embodiment of this application.

Refer to FIG. 6. The 2-step random access process includes the following procedures.

A1: A terminal device sends a preamble and msgA.

Optionally, in some embodiments, the terminal device may send only msgA in A1. For example, when a TA of the terminal device is still valid, or a cell radius is small, the terminal device may send only msgA in step A1. Data sent by the terminal device through a PUSCH may include at least one of a radio resource control (RRC) layer message, identification information of the terminal device, and user plane data. For the identification information of the terminal device, refer to the foregoing related descriptions. Details are not described herein again.

It should be noted that before step A1, the terminal device receives configuration information sent by a base station. The configuration information may include 2-step random access configuration information and PUSCH configuration information. Optionally, the configuration information may further include a correspondence between the 2-step random access configuration information and the PUSCH configuration information. The 2-step random access configuration information includes at least one of random access preamble configuration information and/or time-frequency resource configuration information. The random access preamble configuration information is used to determine a random access preamble, and the time-frequency resource configuration information is used to determine a time-frequency resource for sending the random access preamble.

For example, the 2-step random access configuration information includes preamble configuration information and PUSCH configuration information corresponding to a preamble. The preamble may be in one-to-one correspondence with a PUSCH, a plurality of preambles correspond to one PUSCH, or one preamble corresponds to a plurality of PUSCHs.

Optionally, the configuration information may include a maximum quantity of times for transmitting the preamble or msgA in 2-step random access.

A2: The terminal device receives msgB from the base station.

Specifically, msgB may include one or more RARs, and the RAR includes a success response (success RAR) or a fallback response (fallback RAR). Optionally, msgB may carry indication information, indicating whether the RAR in msgB is a success RAR or a fallback RAR.

The success RAR includes a contention resolution identity. Optionally, the success RAR may indicate that the base station detects the preamble sent by the terminal device and successfully decodes the data sent through the PUSCH corresponding to the preamble. If contention resolution succeeds, the terminal device ends the random access process; otherwise, the terminal device may re-initiate random access.

The fallback RAR may indicate that the base station detects the preamble, but fails to decode the data sent through the PUSCH corresponding to the preamble, and the terminal device does not win in 2-step random access. Specifically, the fallback RAR may include at least one of a preamble identifier, TA information, and initial uplink grant information. After receiving the fallback RAR, the terminal device falls back to a 4-step random access mechanism. In other words, the terminal device may perform step S3.

Optionally, step S4 may be further performed. If contention resolution in step S4 fails, the terminal device initiates 4-step random access based on 4-step random access configuration information, and performs step S1.

It may be understood that, if the terminal device does not receive the message B, and the maximum quantity of times for transmitting msgA is not reached, the terminal device may re-initiate the 2-step random access process.

(4) Fallback Mechanism of 2-Step Random Access

Fallback of 2-step random access includes the following two possible implementations.

In a possible implementation, if a quantity of times for initiating 2-step random access by a terminal device reaches a threshold (for example, reaches the foregoing maximum quantity of times for transmitting msgA or the random access preamble), but has not reached a maximum quantity of access times of a cell connection failure, the terminal device may fall back to 4-step random access. In embodiments of this application, this manner may be referred to as active fallback.

In another possible implementation, the terminal device initiates a 2-step random access process. If msgB received by the terminal device includes a fallback RAR, the terminal device may fall back from 2-step random access to 4-step random access. In embodiments of this application, this manner may be referred to as passive fallback. In a conventional technology, the terminal device may record information in a 4-step random access process, and generate a random access report (RACH report). After accessing a network device, the terminal device sends the RACH report to the network device. The RACH report may include a maximum quantity of times for transmitting a preamble in 4-step random access, and whether a contention is detected. Optionally, the RACH report may further include a carrier type of a cell in which the 4-step random access process is performed, for example, a common uplink carrier or a supplementary uplink (SUL) carrier. An existing RACH report supports only the 4-step random access process, and cannot support the 2-step random access process or a scenario in which the 2-step random access process falls back to the 4-step random access process. A network side cannot optimize configuration of random access based on the RACH report. Consequently, the terminal device may frequently fall back to the 4-step random access process, and a success rate of random access of the terminal device is reduced.

An embodiment of this application provides a communication method. A terminal device sends a first report to a first network device, where the first report includes first information. The first information indicates that the terminal device passively falls back from 2-step random access to 4-step random access, or actively falls back from 2-step random access to 4-step random access. The first network device receives the first report from the terminal device, and performs processing based on the first report. In this embodiment of this application, a network side may adjust corresponding configuration information based on a fallback manner of the terminal device, to improve a success rate of random access of the terminal device, and avoid, as much as possible, frequent 2-step random access fallback caused by inappropriate configuration on the network side. For example, when the first information indicates that the terminal device performs active fallback, a 2-step random access configuration parameter may be adjusted, to reduce a quantity of fallback times of the terminal device. For example, a maximum quantity of times for transmitting a random access preamble or msgA in a 2-step random access process is increased. The terminal device may attempt to send msgA for a plurality of times to initiate 2-step random access, so that the success rate of random access is improved. Alternatively, when the first information indicates that the terminal device performs passive fallback, the network side may adjust a time-frequency resource of 2-step random access, and allocate, to the terminal device, sufficient time-frequency resources for transmitting data (for example, msgA) related to 2-step random access, to improve the success rate of random access.

It may be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

Figure 7A:
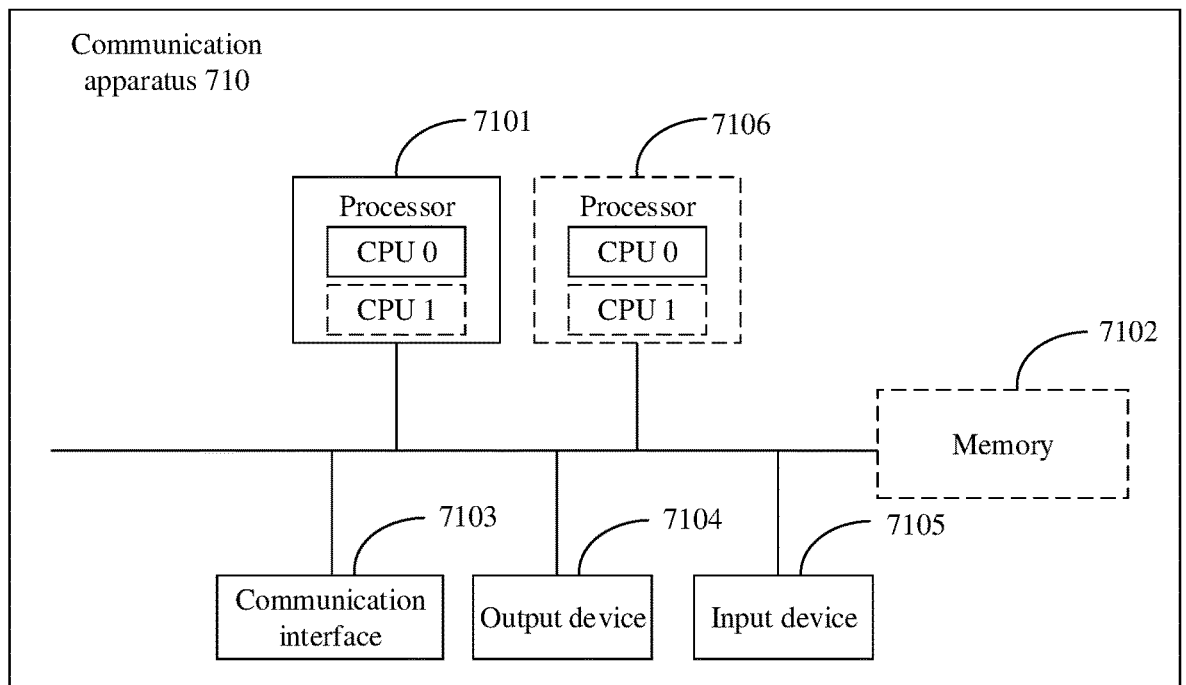
FIG. 7a is a structural block diagram of a communication apparatus according to an embodiment of this application.

The terminal device in embodiments of this application may be implemented by using a communication apparatus 710 in FIG. 7a. FIG. 7a is a schematic diagram of a hardware structure of a communication apparatus 710 according to an embodiment of this application. The communication apparatus 710 includes a processor 7101, a memory 7102, and at least one communication interface (where FIG. 7a is described merely by using an example in which the communication apparatus includes a communication interface 7103). The processor 7101, the memory 7102, and the communication interface 7103 are connected to each other. Optionally, the communication apparatus 710 may not include the memory 7102.

The processor 7101 may be a general-purpose central processing unit (CPU), a microprocessor, an application-specific integrated circuit (ASIC), or one or more integrated circuits configured to control program execution in the solutions of this application.

The communication interface 7103 that uses any apparatus such as a transceiver is configured to communicate with another device or a communication network, for example, Ethernet, a radio access network (RAN), or a wireless local area network (WLAN).

The memory 7102 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of an instruction or a data structure and that can be accessed by a computer. However, this is not limited herein. The memory may exist independently, or may be connected to the processor. The memory may alternatively be integrated with the processor.

The memory 7102 is configured to store computer-executable instructions for executing the solutions of this application, and the processor 7101 controls the execution. The processor 7101 is configured to execute the computer-executable instructions stored in the memory 7102, to implement the communication method provided in the following embodiments of this application.

Optionally, the computer-executable instructions in this embodiment of this application may also be referred to as application program code. This is not specifically limited in this embodiment of this application.

During specific implementation, in an embodiment, the processor 7101 may include one or more CPUs, for example, a CPU 0 and a CPU 1 in FIG. 7a.

During specific implementation, in an embodiment, the communication apparatus 710 may include a plurality of processors, for example, the processor 7101 and a processor 7106 in FIG. 7a. Each of the processors may be a single-core (single-CPU) processor or a multi-core (multi-CPU) processor. The processors herein may be one or more devices, circuits, and/or processing cores for processing data (for example, computer program instructions).

During specific implementation, in an embodiment, the communication apparatus 710 may further include an output device 7104 and an input device 7105. The output device 7104 communicates with the processor 7101, and may display information in a plurality of manners. For example, the output device 7104 may be a liquid crystal display (LCD), a light emitting diode (LED) display device, a cathode ray tube (CRT) display device, or a projector. The input device 7105 communicates with the processor 7101, and may receive an input from a user in a plurality of manners. For example, the input device 7105 may be a mouse, a keyboard, a touchscreen device, or a sensing device.

The communication apparatus 710 may be a general-purpose device or a dedicated device. During specific implementation, the communication apparatus 710 may be a desktop computer, a portable computer, a network server, a palmtop computer (personal digital assistant, PDA), a mobile phone, a tablet computer, a wireless terminal apparatus, an embedded device, or a device having a structure similar to that in FIG. 7a. A type of the communication apparatus 710 is not limited in this embodiment of this application.

It should be noted that the communication apparatus 710 may be an entire terminal, may be a part or component that implements a function of the terminal, or may be a communication chip, for example, a baseband chip. When the communication apparatus 710 is an entire terminal, the communication interface may be a radio frequency module. When the communication apparatus 710 is a communication chip, the communication interface 7103 may be an input/output interface circuit of the chip, where the input/output interface circuit is configured to read and output a baseband signal.

Figure 7B:
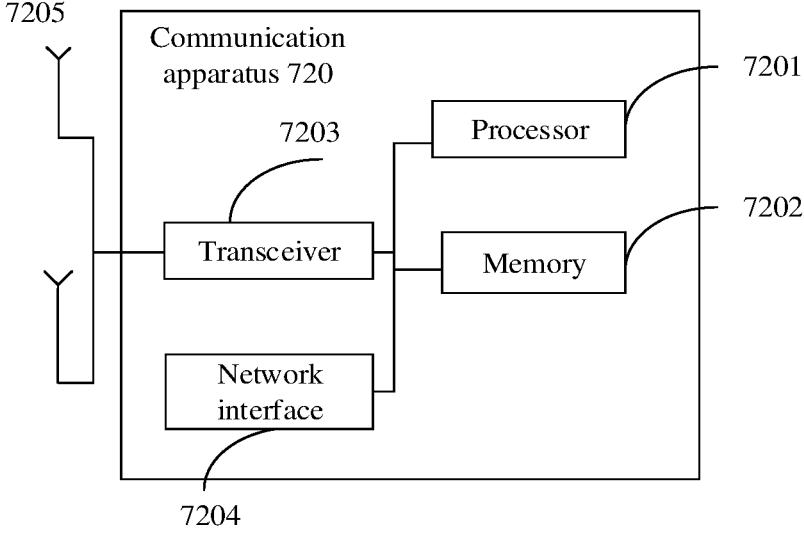
FIG. 7b is another structural block diagram of a communication apparatus according to an embodiment of this application.

The network device in embodiments of this application may be implemented by using a communication apparatus 720 shown in FIG. 7b. For a structure of the communication apparatus 720, refer to a structure shown in FIG. 7b.

The communication apparatus includes at least one processor 7201, at least one memory 7202, at least one transceiver 7203, at least one network interface 7204, and one or more antennas 7205. The processor 720i, the memory 7202, the transceiver 7203, and the network interface 7204 are connected, for example, through a bus. The antenna 7205 is connected to the transceiver 7203. The network interface 7204 is configured to enable the communication apparatus to connect to another communication device through a communication link. For example, the communication apparatus is connected to a core network element through an S1 interface. In this embodiment of this application, the connection may include various types of interfaces, transmission lines, buses, or the like. This is not limited in this embodiment. Optionally, the communication apparatus 720 may not include the memory 7202.

In this embodiment of this application, the processor, such as the processor 7201, may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 7201 may be a single-core (single-CPU) processor or a multi-core (multi-CPU) processor. The at least one processor 7201 may be integrated into one chip or located on a plurality of different chips.

In this embodiment of this application, the memory, such as the memory 7202, may include at least one of the following types: a read-only memory (ROM) or another type of static storage device that can store static information and instructions, a random access memory (RAM) or another type of dynamic storage device that can store information and instructions, or may be an electrically erasable programmable read-only memory (EEPROM). In some scenarios, the memory may alternatively be a compact disc read-only memory (CD-ROM), another compact disc storage, an optical disc storage (including a compressed optical disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. This is not limited thereto.

The memory 7202 may exist independently, or may be connected to the processor 7201. Optionally, the memory 7202 may alternatively be integrated with the processor 7201, for example, integrated into one chip. The memory 7202 can store program code for performing the technical solutions in embodiments of this application, and the processor 720i controls execution of the program code. Various types of executed computer program code may also be considered as drivers of the processor 720i. For example, the processor 7201 is configured to execute the computer program code stored in the memory 7202, to implement the technical solutions in embodiments of this application.

The transceiver 7203 may be configured to support receiving or sending of a radio frequency signal between the communication apparatus and a terminal device, and the transceiver 7203 may be connected to the antenna 7205. Specifically, the one or more antennas 7205 may receive a radio frequency signal. The transceiver 7203 may be configured to: receive the radio frequency signal from the antenna, convert the radio frequency signal into a digital baseband signal or a digital intermediate frequency signal, and provide the digital baseband signal or the digital intermediate frequency signal for the processor 7201, so that the processor 7201 further processes the digital baseband signal or the digital intermediate frequency signal, for example, performs demodulation processing and decoding processing. In addition, the transceiver 7203 may be configured to: receive a modulated digital baseband signal or digital intermediate frequency signal from the processor 7201, convert the modulated digital baseband signal or digital intermediate frequency signal into a radio frequency signal, and send the radio frequency signal through the one or more antennas 7205. Specifically, the transceiver 7203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 7203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. The transceiver may be referred to as a transceiver circuit, a transceiver unit, a transceiver component, a sending circuit, a sending unit, a sending component, or the like.

It should be noted that the communication apparatus 720 may be an entire communication apparatus, may be a part or component that implements a function of the communication apparatus, or may be a communication chip. When the communication apparatus 720 is a communication chip, the transceiver 7203 may be an interface circuit of the chip, where the interface circuit is configured to read and output a baseband signal.

Figure 8:
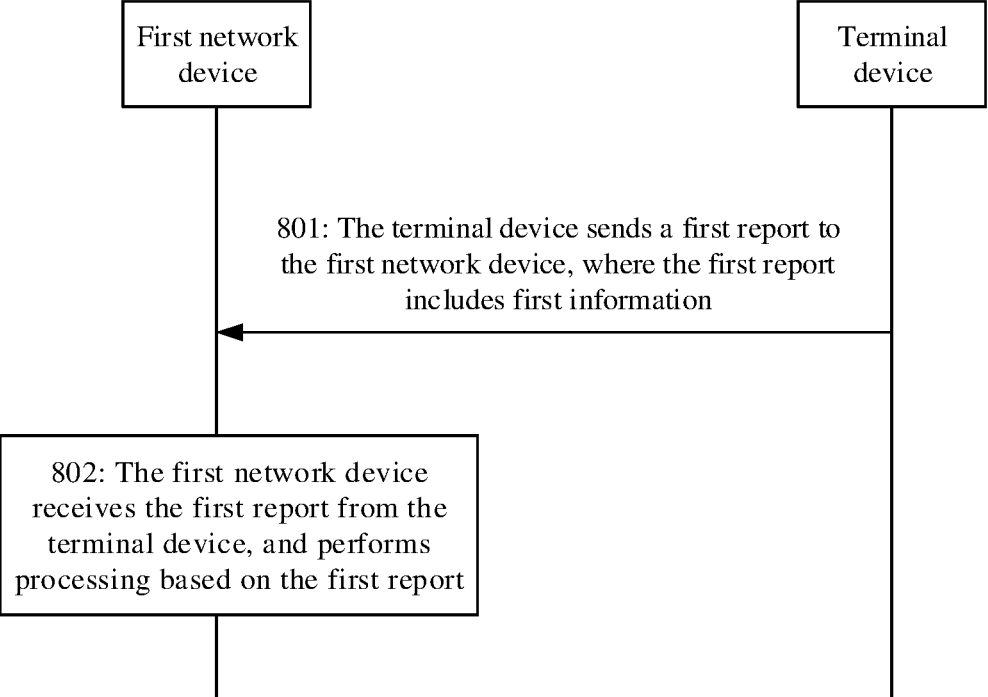
FIG. 8 is a schematic flowchart of a communication method according to an embodiment of this application.

An embodiment of this application provides a communication method. As shown in FIG. 8, the method includes the following procedures.

801: A terminal device sends a first report to a first network device, where the first report includes first information.

The first information indicates that the terminal device passively falls back from 2-step random access to 4-step random access, or actively falls back from 2-step random access to 4-step random access.

Alternatively, the first information indicates a manner in which the terminal device falls back from 2-step random access to 4-step random access. The fallback manner of the terminal device may be passive fallback or active fallback.

Alternatively, the first information indicates whether the terminal device falls back from 2-step random access to 4-step random access; or the first information indicates whether the terminal device receives a fallback indication, for example, the foregoing fallback RAR or RAR type indication information.

In a possible implementation, the terminal device sends a first message to the first network device, where the first message includes the first report, and the first report includes the first information. The first message may be a user equipment information response (UE information response) message, an RRC reconfiguration response message, or an RRC connection reconfiguration response message. The first report may be a report that is related to random access and that is reported by the terminal device to the first network device, for example, a RACH report, a setup failure report, a resume failure report, a radio link failure report, or a handover success report.

It should be noted that, when the terminal device initiates 2-step random access and falls back to 4-step random access in a first cell, the terminal device may generate the first report to record a case in which the terminal device performs random access in the first cell. A network device to which the first cell belongs may be referred to as a network device corresponding to the first report.

In this embodiment of this application, the first network device is a network device to which a cell on which terminal device currently camps belongs. The first network device may be a same network device as the network device corresponding to the first report, or may be a network device different from the network device corresponding to the first report.

For example, the terminal device initiates 2-step random access and falls back to 4-step random access in the cell of the first network device. The terminal device may record information related to random access to generate the first report, and send the first report to the first network device, so that the first network device can optimize a 2-step random access configuration parameter of the terminal device based on information (for example, the first information) in the first report, and the terminal device is prevented as much as possible from frequently falling back to 4-step random access, to improve a success rate of random access.

Alternatively, the terminal device may initiate random access in a cell of a second network device (different from the first network device) and record information related to random access, to generate the first report. When the terminal device moves to the cell of the first network device, the terminal device may send the first report to the first network device, and the first network device may send all or a part of information in the first report to the second network device (for example, determine, based on cell information in the first report, the second network device corresponding to the first report), so that the second network device optimizes the 2-step random access configuration parameter of the terminal device based on the information (for example, the first information) in the first report.

In a possible implementation, the first information is one bit, and the one bit is a first value or a second value. When the one bit is a first value, it indicates active falloff. To be specific, the terminal device actively falls back from 2-step random access to 4-step random access. When the one bit is a second value, it indicates passive falloff. To be specific, the terminal device passively falls back from 2-step random access to 4-step random access.

For example, the first value is "0", and the second value is "1"; or the first value is "1", and the second value is "0".

Optionally, the first report may include second information, and the second information indicates a quality threshold of 2-step random access. The second information is used by a network device to determine whether the quality threshold of 2-step random access configured for the terminal device is appropriate.

For example, the terminal device measures signal quality to obtain a measurement result, compares the measurement result with the quality threshold of 2-step random access, and chooses to perform 4-step random access or 2-step random access. The signal quality may be represented by at least one of a received signal code power (RSCP), a reference signal received power (RSRP), reference signal received quality (RSRQ), a signal-to-noise ratio (SNR), a signal to interference plus noise ratio (SINR), a reference signal strength indication (RSSI), or other signal quality. Correspondingly, different signal quality representations also have corresponding quality thresholds.

Optionally, the first report may include third information, and the third information is used by the network device to determine 2-step random access configuration information used when the terminal device falls back from 2-step random access to 4-step random access. The third information includes at least one of the following information: physical uplink shared channel PUSCH configuration information configured for the terminal device in 2-step random access, random access configuration information in 2-step random access, and a correspondence between the random access configuration information and the PUSCH configuration information. The third information may be obtained by the terminal device from a system message, or may be obtained from dedicated signaling.

The random access configuration information includes at least one of random access preamble configuration information and/or time-frequency resource configuration information. The random access preamble configuration information is used to determine a random access preamble, and the time-frequency resource configuration information is used to determine a time-frequency resource for sending the random access preamble.

Optionally, the first report may include fourth information, and the fourth information is used by the network device to determine time information for the terminal device to fall back from 2-step random access to 4-step random access. The time information may indicate a time point, a time length, a relative time point, or a time deviation. The time point refers to a specific moment. For example, the time information may be a moment at which 2-step random access is initiated, a moment at which the terminal device sends MSG1, a moment at which the terminal device receives 2-step random access configuration information, a moment at which the terminal device performs 2-step random access, or a moment at which the terminal device initiates 4-step random access after 2-step random access fails. This is not limited in this embodiment of this application.

The time length is used as an example. The fourth information may be a time length that exists after "the terminal device receives the 2-step random access configuration information". For example, the time information is a time length between a moment at which "the terminal device receives the 2-step random access configuration information" and a moment at which "the terminal device reports the first report".

Alternatively, the fourth information may be a time length that exists after the terminal device falls back to 4-step random access. For example, the time information is a time length between a moment at which "the terminal device falls back from 2-step random access to 4-step random access" and a moment at which "the terminal device reports the first report".

Optionally, the first report may include fifth information, and the fifth information indicates the first cell in which the terminal device performs 2-step random access. The first cell is a cell in which the terminal device fails to initiate 2-step random access and falls back to 4-step random access, or the first cell is a cell corresponding to the first report recorded by the terminal device. The fifth information may include at least one of the following cell information: a cell global identifier (CGI) of the cell, a physical cell identifier (PCI) and frequency information, and a cell identifier.

In a possible implementation, the fifth information may indicate whether the first report is a report corresponding to a cell of a secondary node.

For example, in the scenario shown in FIG. 2, the terminal device may initiate random access (for example, 2-step random access) in a cell of a master node MN. After 2-step random access performed in the cell of the master node fails, the terminal device may fall back to 4-step random access. If the terminal device successfully performs random access in the cell of the MN, the terminal device may send the first report to a master network device (for example, the first network device in this embodiment of this application) to which the cell of the MN belongs, to indicate information related to 2-step random access performed in the cell of the master node.

In addition, when a secondary node SN is added or changed, the terminal device may initiate random access in a cell of a new SN. In a possible implementation, after 2-step random access performed by the terminal device in a cell of the secondary node fails, the terminal device may fall back to 4-step random access. The terminal device may send the first report to the master network device, to indicate information related to 2-step random access performed in the cell of the secondary node. The first report further includes the fifth information. For example, the fifth information may be cell information of the secondary node, or the fifth information may indicate whether the first report is a report corresponding to the cell of the secondary node.

Optionally, the first report may include sixth information, and the sixth information indicates at least one of the following information: a network type of the first cell, a frequency type of the first cell, a service type of the first cell, and a type of the first cell, where the first cell is a cell in which the terminal device performs 2-step random access.

The network type may include a public network, a non-public network (NPN), a standalone non-public network (standalone NPN, SNPN), a non-standalone non-public network (for example, a public network integrated non-public network (public network integrated NPN, PNI-NPN)), or a closed access group (CAG).

The frequency type may include a carrier type of the first cell. For example, the frequency type is NR UL, a supplementary uplink carrier, or an unlicensed band cell.

The service type is a type of a service applied by the terminal device in the first cell. The service type may include mobile broadband (MBB), enhanced mobile broadband (eMBB), an industrial internet of things (IIoT), ultra-reliable and low-latency communication (URLLC), an internet of things (machine-type communication, MTC), a massive internet of things (massive machine-type communications, mMTC), a narrowband internet of things (narrowband IoT, NB-IoT), augmented reality (AR), virtual reality (VR), or another service type.

The type of the first cell may include at least one of the following types: a non-terrestrial network (NTN) cell, a terrestrial cell, a low earth orbit (LEO) satellite cell, a geostationary earth orbit (GEO) satellite cell, a low earth orbit regeneration cell, a low earth orbit transparent transmission cell, and the like.

In a possible implementation, the first report may include seventh information, and the seventh information indicates at least one of the following information: a maximum quantity of times for transmitting the random access preamble or msgA in 2-step random access, whether the terminal device detects a contention in 2-step random access, whether a maximum transmit power of the terminal device is reached, and an actual quantity of times for transmitting the random access preamble by the terminal device in 2-step random access. The actual quantity of transmission times is less than or equal to the maximum quantity of times for transmitting the random access preamble or msgA. For example, if the terminal device receives msgB, but a CR ID in msgB is different from a CR ID of the terminal device, it indicates that the terminal device detects a contention.

In a possible implementation, the first report may include eighth information, and the eighth information may indicate at least one of the following information: a maximum quantity of times for transmitting the random access preamble in 4-step random access, whether the terminal device detects a contention in 4-step random access, whether a maximum transmit power of the terminal device is reached, and an actual quantity of times for transmitting the random access preamble by the terminal device in 4-step random access. The actual quantity of transmission times is less than or equal to the maximum quantity of times for transmitting the random access preamble. For example, if the terminal device receives MSG4, but an identifier in MSG4 is different from an identifier of the terminal device, it indicates that the terminal device detects a contention.

In a possible implementation, the terminal device also sends one or more of the first information to the eighth information to the first network device by using different messages. It may be understood that the terminal device sends one or more of the first information to the eighth information to a first network device by using N messages, where N is a positive integer less than 8. For example, one message may carry two pieces of information, or may carry more information. This is not limited herein.

It may be understood that the first report may include one or more of the first information to the eighth information.

802: The first network device receives the first report from the terminal device, and performs processing based on the first report.

In some possible implementations, the first network device receives the first report sent by the terminal device, and performs corresponding processing based on the first report.

For example, the first network device obtains the first report from the first message. If the first network device is a network device corresponding to the first report, the first network device may optimize, based on the first report, a 2-step random access parameter configured for the terminal device, to improve the success rate of random access of the terminal device.

For another example, if the first network device determines that the second network device is a network device corresponding to the first report, the first network device sends a part or all of information in the first report to the second network device, so that the second network device can optimize, based on the part or all of the information in the first report, a 2-step random access parameter configured for the terminal device, to improve the success rate of random access. Optionally, the first network device may further send type information of the first report. A type of the first report may be pure 5G (for example, NR or gNB), 4G (for example, eLTE or ng-eNB) connected to a 5G core network, or pure 4G (for example, LTE or eNB). Optionally, the second network device may determine an encoding format of the first report based on the type information of the first report, to perform corresponding decoding.

In a possible implementation, the first network device is a centralized unit CU, and the second network device is a distributed unit DU. The first network device sends the part or all of the information in the first report to the second network device through an F1 interface. Optionally, the first network device may further send the type information of the first report to the second network device.

In another possible implementation, the first network device and the second network device are different base stations. The first network device may directly or indirectly send the part or all of the information in the first report to the second network device. Optionally, the first network device may further send the type information of the first report to the second network device. For example, if there is an interface that can be directly used for communication between the first network device and the second network device, the first network device sends the part or all of the information in the first report to the second network device through an interface between the base stations. The interface between the first network device and the second network device may be an X2 interface or an Xn interface. Optionally, the part or all of the information in the first report may be sent to the second network device by using a failure indication (RLF INDICATION) message or a handover report message.

If the first network device and the second network device cannot directly communicate with each other, the first network device may send the part or all of the information in the first report to the second network device via another device (for example, a core network device). Optionally, the first network device may further send the type information of the first report to the second network device. For example, the part or all of the information in the first report is sent to the core network device through an interface between the base station and the core network device. Optionally, the first network device sends the part or all of the information in the first report to the core network device through an S1 or NG interface, and the core network device forwards, to the second network device, the information received from the first network device. The first network device may send the part or all of the information in the first report to the second network device by using the following messages on the S1/NG interface: an uplink RAN configuration transfer message, a downlink RAN configuration transfer message, a base station configuration transfer (eNB CONFIGURA-TION TRANSFER) message, or a core network device configuration transfer (MME CONFIGURATION TRANS-FER) message.

In another possible implementation, the first network device is a CU, and the second network device is a base station. For example, a first base station includes a CU and a DU. The terminal device may send the first report to the CU, and the CU may send the part or all of the information in the first report to a second base station.

Alternatively, the first network device is a base station, and the second network device is a CU. For example, a second base station includes a CU and a DU. The terminal device may send the first report to a first base station, and the first base station may send the part or all of the information in the first report to the CU.

The following describes, with reference to specific information, optimization processing that may be performed by a network device (for example, the first network device or the second network device in this embodiment of this application) based on the first report.

When the first report includes the first information, and the first information indicates that the terminal device performs active fallback, the network device may adjust a 2-step random access configuration parameter, to reduce a quantity of fallback times of the terminal device. For example, the maximum quantity of times for transmitting the random access preamble or msgA in the 2-step random access process is increased. The terminal device may attempt to send msgA for a plurality of times to initiate 2-step random access, so that the success rate of random access is improved.

Alternatively, when the first information indicates that the terminal device performs passive fallback, a network side may adjust a time-frequency resource of 2-step random access, and allocate, to the terminal device, sufficient time-frequency resources for transmitting data (for example, msgA) related to 2-step random access, to improve the success rate of random access.

When the first report includes the second information, the network device may increase the quality threshold of 2-step random access, so that the terminal device selects 4-step random access as much as possible. The terminal device is prevented, to some extent, from frequently falling back to the 4-step random access process, to improve the success rate of random access of the terminal device.

When the first report includes the third information, the network device may determine, based on the third information, a PUSCH through which the terminal device sends data in 2-step random access, and may adjust a time-frequency resource of the PUSCH, to avoid, as much as possible, a 2-step random access failure of the terminal device caused by insufficient time-frequency resources of the PUSCH.

Alternatively, the second network device may determine a time-frequency resource of the random access preamble based on the third information, and may adjust the time-frequency resource of the random access preamble, to avoid, as much as possible, a random access failure of the terminal device caused by insufficient time-frequency resources for sending the random access preamble.

Alternatively, the second network device may determine a correspondence between the random access configuration information and the PUSCH based on the third information, and may adjust the correspondence. For example, one 2-step random access preamble may correspond to more PUSCHs, to avoid a 2-step random access failure of the terminal device caused by insufficient time-frequency resources of the PUSCH. Alternatively, more 2-step random access resources and corresponding PUSCHs may be allocated.

When the first report includes the fourth information, the network device determines, based on the time information indicated by the fourth information, the 2-step random access configuration information that causes current 2-step random access fallback, to adjust the 2-step random access configuration information, and improve the success rate of performing 2-step random access by the terminal device. In this way, the terminal device is prevented, to some extent, from frequently falling back to 4-step random access.

When the first report includes the fifth information, the network device may determine, based on the fifth information, a network device corresponding to the first report, and forward the part or all of the information in the first report to the network device. For example, the first network device determines, based on the fifth information, a cell corresponding to the first report, to determine a network device corresponding to the first report, for example, the second network device in this embodiment of this application. The first network device may forward the part or all of the information in the first report to the second network device, for example, forward one or more of the first information to the eighth information to the second network device.

When the first report includes the sixth information, the network device may determine a feature of a cell in which the terminal device performs 2-step random access, to optimize the 2-step random access configuration information based on the feature of the cell, and improve the success rate of random access of the terminal device. The feature of the cell may be one or more of a network type, a frequency type, or a service type of the cell.

For example, the 2-step random access parameter is optimized based on the network type of the first cell, and a degree of matching between an optimized parameter and the network type of the first cell is improved. This helps improve the success rate of performing random access by the terminal device in the first cell. The 2-step random access parameter is optimized based on the service type of the first cell, and a degree of matching between an optimized parameter and the network type of the first cell is improved. For example, the optimized parameter is more suitable for a requirement of an NPN network. This helps improve the success rate of performing random access by the terminal device in the first cell.

When the first report includes the seventh information, the network device may adjust a maximum quantity of times for transmitting the 2-step random access preamble or msgA, so that the terminal device attempts to send the random access preamble for a plurality of times to initiate 2-step random access. This helps improve the success rate of performing 2-step random access by the terminal device in the first cell.

When the first report includes the eighth information, the network device may adjust a 4-step random access configuration parameter, for example, a maximum quantity of times for transmitting a 4-step random access preamble. This helps improve the success rate of performing 4-step random access by the terminal device in the first cell.

Figure 9:
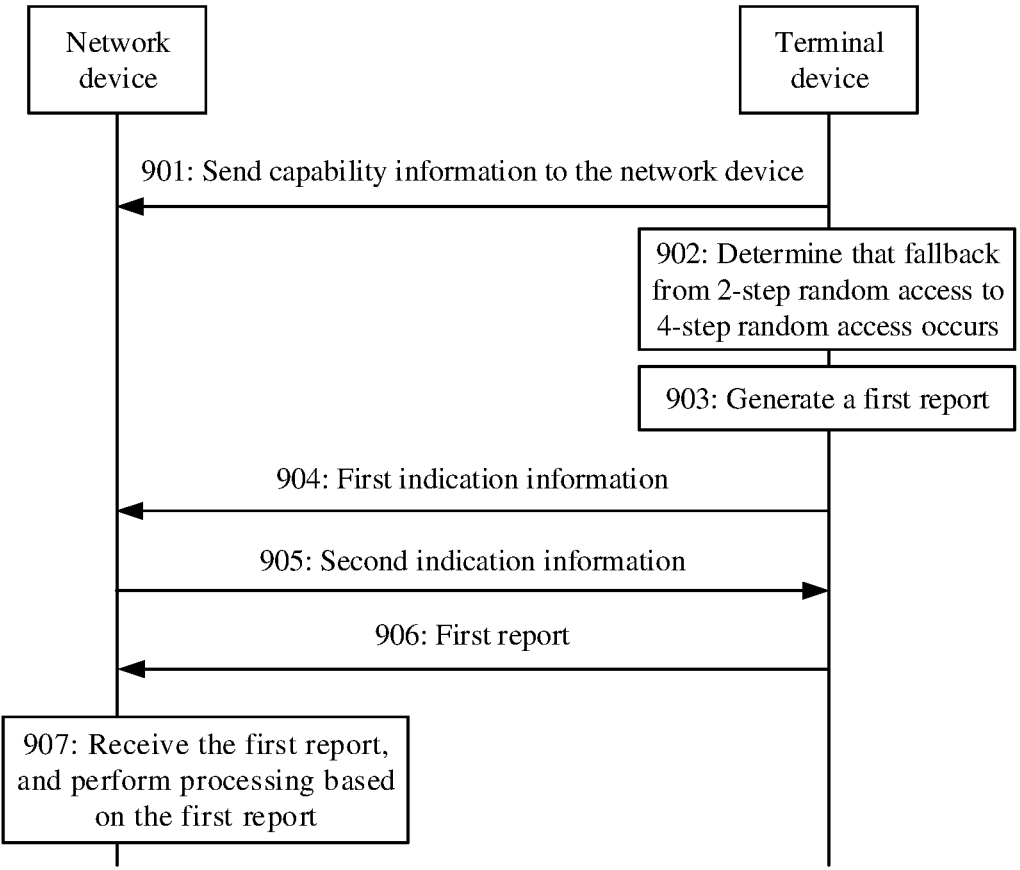
FIG. 9 is another schematic flowchart of a communication method according to an embodiment of this application.

In the method shown in FIG. 8, the terminal device actively reports, to the network device, information related to random access fallback. Different from this, an embodiment of this application further provides a communication method in which before recording and reporting information related to random access fallback, a terminal device may further indicate a reporting requirement of the terminal device to a network device, and the terminal device reports the information related to random access falloff only after the network device indicates the terminal device to report the information related to random access fallback. As shown in FIG. 9, the method includes the following steps.

901: A terminal device sends capability information to a network device.

The capability information indicates that the terminal device supports recording of a report related to 2-step random access, or the terminal device supports recording of a report of fallback from 2-step random access to 4-step random access.

902: The terminal device determines that fallback from 2-step random access to 4-step random access occurs.

In some possible implementations, the terminal device receives 2-step random access configuration information or 4-step random access configuration information, and chooses, based on signal quality obtained through measurement, to perform 2-step random access. For a procedure of performing 2-step random access by the terminal device, refer to FIG. 6 and the foregoing related descriptions of FIG. 6. Details are not described herein again.

The terminal device may further fall back to 4-step random access. In a possible implementation, the terminal device receives a fallback indication (for example, a fallback RAR) sent by the network device, and passively falls back to 4-step random access.

In another possible implementation, when determining that 2-step random access fails, the terminal device actively falls back to 4-step random access. For example, if a quantity of times that the terminal device sends a random access preamble or msgA in 2-step random access reaches a maximum quantity of times for transmitting the random access preamble, the terminal device determines that 2-step random access fails. Alternatively, if the terminal device receives msgB, but a CR ID in msgB is different from a CR ID of the terminal device, it is determined that 2-step random access fails. During specific implementation, for a procedure of performing 4-step random access by the terminal device, refer to FIG. 5 and the foregoing related descriptions of FIG. 5. Details are not described herein again.

903: The terminal device generates a first report.

Optionally, the terminal device may receive indication information that is sent by the network device and that is used to indicate whether the terminal device records the first report. The terminal device may determine, based on the indication information, whether to generate the first report.

The first report is used to record information related to 2-step random access performed by the terminal device. For example, the first report includes one or more of first information to eighth information in this embodiment of this application.

904: The terminal device sends first indication information to the network device.

The first indication information indicates that the terminal device needs to send, to the network device, the report related to 2-step random access, for example, the first report in this embodiment of this application.

In an example, the terminal device may send the first indication information to the network device by using any one of an RRC connection setup complete message, an RRC connection resume request message, an RRC connection resume complete message, an RRC connection reconfiguration complete message, an RRC setup complete message, an RRC resume request message, an RRC resume complete message, and an RRC reconfiguration complete message.

905: The network device sends second indication information to the terminal device.

The second indication information indicates the terminal device to send the report related to 2-step random access, for example, the first report in this embodiment of this application.

For example, the network device may send the second indication information to the terminal device by using any one of a terminal device information request message, an RRC connection reconfiguration message, and an RRC reconfiguration message.

906: The terminal device sends the first report to the network device.

907: The network device receives the first report, and performs processing based on the first report.

It may be understood that the network devices in the foregoing steps are used in a general sense. In other words, the network devices in all the steps may be the same or may be different. For detailed descriptions of step 906 and step 907, respectively refer to descriptions of step 801 and step 802. Details are not described herein again.

In this scenario, a sequence of steps 901, 902, and 903 is not limited. Step 902 may be performed first, and then step 901 and step 903 are performed. Alternatively, steps 902 and 903 may be performed first, and then step 901 is performed. In an implementation, step 901 is optional. Step 901 may be ignored, and steps 902 to 907 are performed.

In another possible implementation, after performing random access fallback in a cell of a network device, the terminal device may further send, to another network device, the report related to 2-step random access. In step 907, the network device may determine, based on information in the first report, a network device corresponding to the first report, and send a part or all of the information in the first report to the network device corresponding to the first report, so that the network device corresponding to the first report can optimize a 2-step random access configuration parameter based on the received information. In this way, the terminal device is prevented from frequently falling back to the 4-step random access, and a success rate of random access of the terminal device is improved.

In this scenario, steps 902 and 903 are performed first, and then step 901 is performed.

It should be noted that the steps in the procedure shown in FIG. 9 are not necessary steps for implementing the communication method provided in this embodiment of this application, and only some of the steps may be performed to implement the communication method.

In a possible implementation, the network device may indicate the terminal device to report information related to random access fallback. After receiving an indication from the network device, the terminal device reports the information related to random access fallback. For example, the network device sends third indication information to the terminal device, where the third indication information indicates the terminal device to report the information about random access fallback. After receiving the third indication information, the terminal device reports the first report to the network device, where the first report includes information and specific descriptions of each piece of information. For details, refer to the foregoing descriptions. Details are not described herein.

Figure 10:
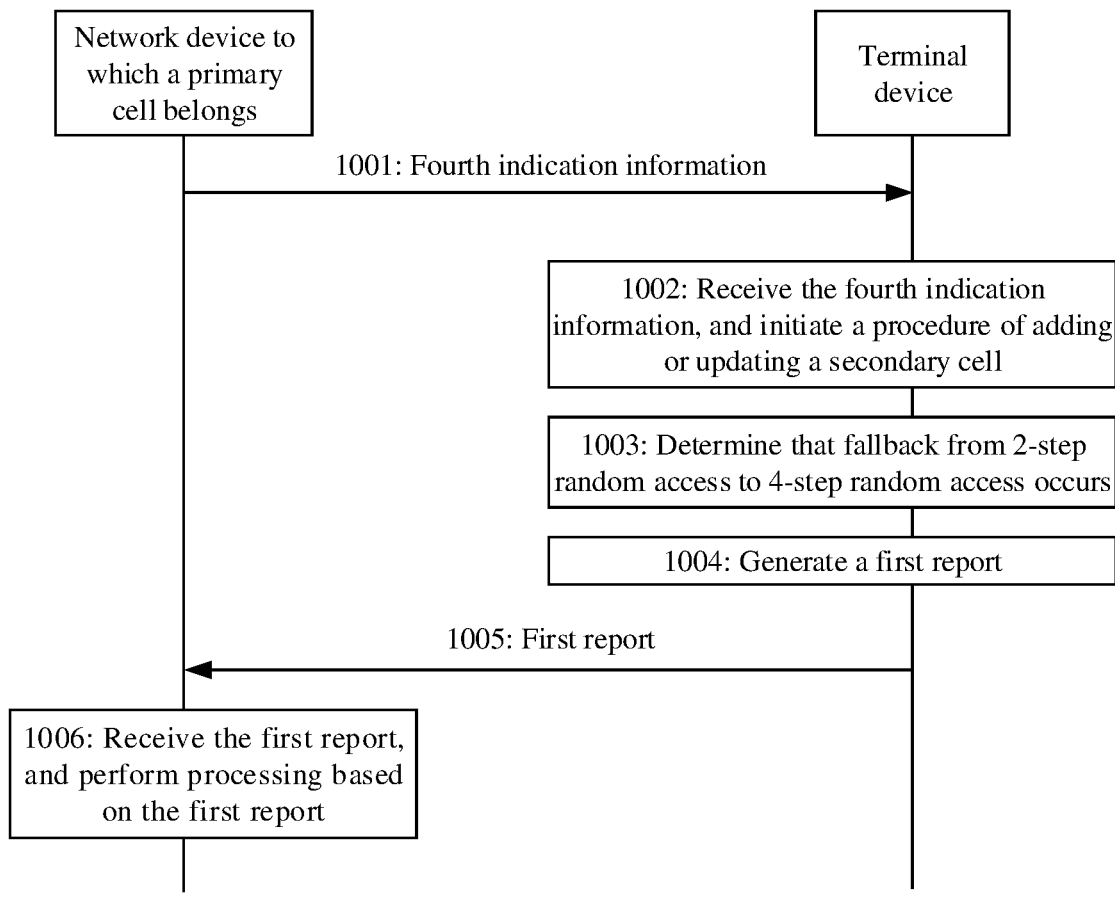
FIG. 10 is another schematic flowchart of a communication method according to an embodiment of this application.

In the communication system shown in FIG. 2, in a scenario in which the network device indicates the terminal device to add a secondary cell SN, the terminal device may initiate random access on the added secondary cell, and fallback from 2-step random access to 4-step random access may occur. In a scenario in which the network device indicates the terminal device to update a secondary cell SN, the terminal device may initiate random access on the updated secondary cell, and fallback from 2-step random access to 4-step random access may occur. In the foregoing two scenarios, the terminal device may report, to a primary cell MN, information related to random access fallback, so that a network device to which the primary cell MN belongs (for example, a base station to which the primary cell MN belongs) optimizes a random access configuration parameter, to improve a success rate of performing random access by the terminal device in the secondary cell. An embodiment of this application further provides a communication method, to support a terminal device in reporting information related to random access fallback in the foregoing scenario. As shown in FIG. 10, the method includes the following steps.

1001: A network device to which a primary cell belongs sends fourth indication information to a terminal device.

The fourth indication information is used to indicate the terminal device to add a secondary cell or update a secondary cell.

1002: The terminal device receives the fourth indication information, and initiates a procedure of adding a secondary cell or updating a secondary cell.

1003: The terminal device determines that fallback from 2-step random access to 4-step random access occurs.

In some possible implementations, the terminal device initiates 2-step random access in the procedure of adding a secondary cell or updating a secondary cell. Adding a secondary cell is used as an example. After receiving SN reconfiguration complete from the primary cell, the terminal device initiates random access in the secondary cell.

In some possible implementations, the terminal device receives 2-step random access configuration information or 4-step random access configuration information, and chooses, based on signal quality obtained through measurement, to perform 2-step random access. For a procedure of performing 2-step random access by the terminal device, refer to FIG. 6 and the foregoing related descriptions of FIG. 6. Details are not described herein again.

The terminal device may further fall back to 4-step random access. In a possible implementation, the terminal device receives a fallback indication (for example, a fallback RAR) sent by the network device, and passively falls back to 4-step random access.

In another possible implementation, when determining that 2-step random access fails, the terminal device actively falls back to 4-step random access. For example, if a quantity of times that the terminal device sends a random access preamble or msgA in 2-step random access reaches a maximum quantity of times for transmitting the random access preamble, the terminal device determines that 2-step random access fails. Alternatively, if the terminal device receives msgB, but a CR ID in msgB is different from a CR ID of the terminal device, it is determined that 2-step random access fails. During specific implementation, for a procedure of performing 4-step random access by the terminal device, refer to FIG. 5 and the foregoing related descriptions of FIG. 5. Details are not described herein again.

1004: The terminal device generates a first report.

The first report is used to record information related to random access performed by the terminal device. For example, the first report includes one or more of first information to eighth information in this embodiment of this application.

1005: The terminal device sends the first report to the network device to which the primary cell belongs.

1006: The network device to which the primary cell belongs receives the first report, and performs processing based on the first report.

For example, the network device to which the primary cell performs may send a part or all of information in the first report to a network device to which the secondary cell belongs, so that the network device to which the secondary cell belongs determines, based on the received information, a configuration parameter for performing random access by the terminal device in the secondary cell, and optimizes the configuration parameter, to improve a success rate of performing random access by the terminal device in the secondary cell.

It should be noted that step 1005 and step 1006 are optional steps, and step 1005 and step 1006 may not be performed. After step 1001 to step 1004 are performed, the terminal device may further send the first report to the network device to which the secondary cell belongs, and the network device to which the secondary cell belongs may determine, based on the information in the first report, the configuration parameter for performing random access by the terminal device in the secondary cell, and optimize the configuration parameter, to improve the success rate of performing random access by the terminal device in the secondary cell.

It should be noted that the steps in the procedure shown in FIG. 10 are not necessary steps for implementing the communication method provided in this embodiment of this application, and only some of the steps may be performed to implement the communication method.

Figure 11:
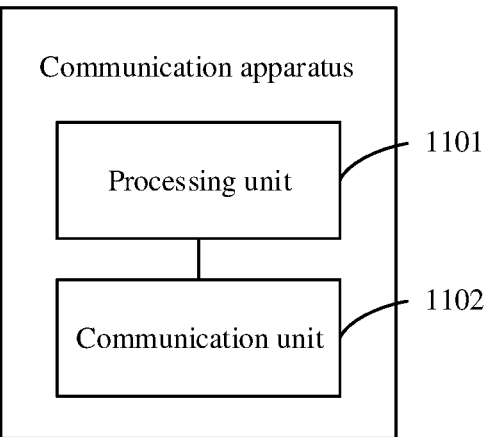
FIG. 11 to FIG. 14 each are another structural block diagram of a communication apparatus according to an embodiment of this application.

When each function module is obtained through division based on each corresponding function, FIG. 11 is a schematic diagram of a possible structure of the communication apparatus in the foregoing embodiments. The communication apparatus shown in FIG. 11 may be the terminal device described in embodiments of this application, or may be a component that implements the foregoing method in the terminal device, or may be a chip used in the terminal device. The chip may be a system-on-a-chip (SOC), a baseband chip with a communication function, or the like. As shown in FIG. 11, the communication apparatus includes a processing unit 1101 and a communication unit 1102. The processing unit may be one or more processors, and the communication unit may be a transceiver or a communication interface.

For example, the processing unit 1101 may be configured to support the terminal device in performing step 902 and step 903, or step 1002 to step 1004, and/or is configured to perform another process of the technology described in this specification.

The communication unit 1102 is configured to support communication between the terminal device and another communication apparatus, for example, support the terminal device in performing one or more of step 801, step 901, step 904 to step 906, step 1002, and step 1005, and/or is configured to perform another process the technology described in this specification.

It should be noted that all related content of the steps in the foregoing method embodiments may be cited in function descriptions of corresponding function modules. Details are not described herein again.

Figure 12:
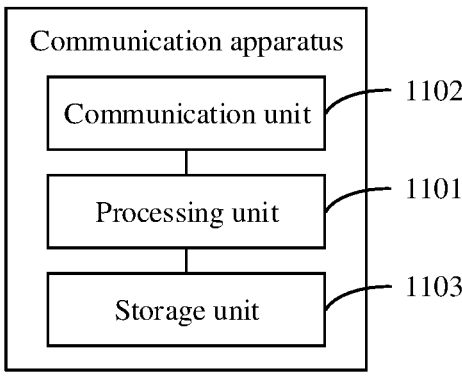

As shown in FIG. 12, the communication apparatus may further include a storage unit 1103, and the storage unit 1103 is configured to store program code and/or data of the communication apparatus.

The processing unit 1101 may include at least one processor. The communication unit 1102 may be a transceiver or a communication interface, and the storage unit 1103 may include a memory.

Figure 13:
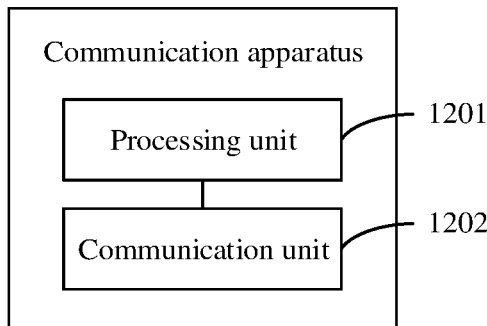

When each function module is obtained through division based on each corresponding function, FIG. 13 is a schematic diagram of a possible structure of the communication apparatus in the foregoing embodiments. The communication apparatus shown in FIG. 13 may be the first network device described in embodiments of this application, or may be a component that implements the foregoing method in the network device, or may be a chip used in the network device. The chip may be a system-on-a-chip (SOC), a baseband chip with a communication function, or the like. As shown in FIG. 13, the communication apparatus includes a processing unit 1201 and a communication unit 1202. The processing unit 1201 may be one or more processors, and the communication unit 1202 may be a transceiver or a communication interface.

The processing unit 1201 is configured to support the network device in performing step 801, step 907, and step 1006, and/or is configured to perform another process of the technology described in this specification.

The communication unit 1202 is configured to support communication between the network device and another communication apparatus, for example, support the network device in performing step 802, step 901, step 904 to step 906, step 1001, and step 1005, and/or is configured to perform another process the technology described in this specification.

It should be noted that all related content of the steps in the foregoing method embodiments may be cited in function descriptions of corresponding function modules. Details are not described herein again.

Figure 14:
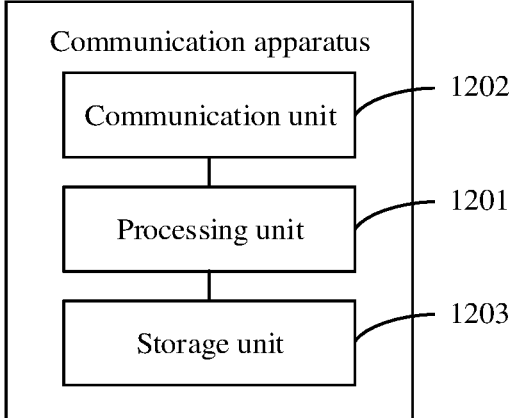

As shown in FIG. 14, the communication apparatus may further include a storage unit 1203, and the storage unit 1203 is configured to store program code and data of the communication apparatus.

The processing unit 1201 may include at least one processor. The communication unit 1202 may be a transceiver or a communication interface, and the storage unit 1203 may include at least one memory.

For a structure of the second network device in embodiments of this application, refer to FIG. 13 or FIG. 14. The communication unit 1202 is configured to support communication between the second network device and another device, for example, support the second network device in receiving a part or all of information in a first report sent by the first network device. The processing unit 1201 is configured to support the second network device in performing processing based on the part or all of the information in the received first report, for example, optimizing a random access configuration parameter based on the part or all of the information in the first report, to improve a success rate of random access of the terminal device.

It should be noted that, in the foregoing communication apparatus embodiments, each unit may also be correspondingly referred to as a module, a component, a circuit, or the like.

An embodiment of this application provides a computer-readable storage medium. The computer-readable storage medium stores instructions. The instructions are used to perform the method shown in FIG. 8, FIG. 9, or FIG. 10.

An embodiment of this application provides a computer program product including instructions. When the computer program product runs on a communication apparatus, the communication apparatus is enabled to perform the method shown in FIG. 8, FIG. 9, or FIG. 10.

An embodiment of this application provides a wireless communication apparatus. The wireless communication apparatus stores instructions; and when the wireless communication apparatus is run on the communication apparatuses shown in FIG. 7a, FIG. 7b, and FIG. 11 to FIG. 14, the communication apparatus is enabled to perform the method shown in FIG. 8, FIG. 9, or FIG. 10. The wireless communication apparatus may be a chip.

An embodiment of this application further provides a communication system, including a terminal device and a network device. For example, the terminal device may be the communication apparatus shown in FIG. 7a, FIG. 11, or FIG. 12, and the network device may be the communication apparatus shown in FIG. 7b, FIG. 13, or FIG. 14.

The foregoing descriptions about implementations allow a person skilled in the art to understand that, for the purpose of convenient and brief description, division of the foregoing function modules is used as an example for illustration. During actual application, the foregoing functions may be allocated to different function modules and implemented based on a requirement, that is, an inner structure of a communication apparatus is divided into different function modules to implement all or some of the functions described above.

The processor in this embodiment of this application may include but is not limited to at least one of the following various computing devices that run software: a central processing unit (central processing unit, CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to constitute a semiconductor chip. For example, the processor may constitute a SoC (system-on-a-chip) with another circuit (for example, an encoding/decoding circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (FPGA), a PLD (programmable logic device), or a logic circuit that implements a special-purpose logic operation.

In this embodiment of this application, the memory may include at least one of the following types: a read-only memory (ROM) or another type of static storage device that can store static information and instructions, a random access memory (RAM) or another type of dynamic storage device that can store information and instructions, or may be an electrically erasable programmable read-only memory (EEPROM). In some scenarios, the memory may alternatively be a compact disc read-only memory (CD-ROM), another compact disc storage, an optical disc storage (including a compressed optical disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. This is not limited thereto.

In this application, "at least one" means one or more. "A plurality of" means two or more than two. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, for convenience of clear description of the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference.

In the several embodiments provided in this application, it should be understood that the disclosed database access apparatus and method may be implemented in other manners. For example, the described database access apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A first apparatus, comprising:
at least one processor, wherein the at least one processor is coupled to a non-transitory memory,
the non-transitory memory storing a computer program, that when executed by the at least one processor, causes the first apparatus to perform operations including:
receiving, from a terminal device, a first report, wherein the first report comprises information indicating a maximum quantity of times that msgA is transmitted in 2-step random access by the terminal device, wherein the first report including the information indicating the maximum quantity is received by the first apparatus in one of a user equipment (UE) information response message, a radio resource control (RRC) reconfiguration response message, or an RRC connection reconfiguration response message, and
wherein the first report further comprises second information, and the second information comprises at least one of: information about a physical uplink shared channel (PUSCH) configured for the terminal device for the 2-step random access or random access configuration information for the 2-step random access; and
performing processing based on the first report, the performing comprising:
optimizing the random access configuration information for the 2-step random access based on the first report.

2. The first apparatus according to claim 1, wherein the first report further comprises third information, and the third information indicates a quality threshold used in determining whether to perform the 2-step random access.

3. The first apparatus according to claim 1, wherein the first report further comprises fourth information, and the fourth information indicates time information when the terminal device falls back to 4-step random access from the 2-step random access.

4. The first apparatus according to claim 1, wherein the performing the processing based on the first report comprises:
sending a part or all of information comprised in the first report to a second apparatus.

5. The first apparatus according to claim 4, wherein
the first apparatus is a centralized unit (CU), and the second apparatus is a distributed unit (DU); or
the first apparatus and the second apparatus are base stations.

6. A method applied for a terminal device, comprising:
generating a first report, wherein the first report comprises information indicating a maximum quantity of times that msgA is transmitted in 2-step random access by the terminal device; and
sending, to a first network device, the first report for the first network device to optimize random access configuration information for the 2-step random access, wherein the first report including the information indicating the maximum quantity is received by the first network device in one of a user equipment (UE) information response message, a radio resource control (RRC) reconfiguration response message, or an RRC connection reconfiguration response message, and
wherein the first report further comprises second information, and the second information comprises at least one of: information about a physical uplink shared channel (PUSCH) configured for the terminal device for the 2-step random access or the random access configuration information for the 2-step random access.

7. The method according to claim 6, wherein the first report further comprises third information, and the third information indicates a quality threshold used by the terminal device in determining whether to perform the 2-step random access.

8. The method according to claim 6, wherein the first report further comprises fourth information, and the fourth information indicates time information when the terminal device falls back to 4-step random access from the 2-step random access.

9. The method according to claim 6, wherein the first report further comprises fifth information, and the fifth information indicates cell information for the terminal device to perform the 2-step random access.

10. The method according to claim 6, wherein the first report further comprises sixth information, and the sixth information indicates at least one of: a network type of a first cell, a frequency type of the first cell, a service type of the first cell, or a type of the first cell, and wherein
the first cell is a cell in which the terminal device performs the 2-step random access.

11. An apparatus, comprising:
at least one processor, wherein the at least one processor is coupled to a non-transitory memory,
the non-transitory memory storing a computer program, that when executed by the at least one processor, causes the apparatus to perform operations including:
generating a first report, wherein the first report comprises information indicating a maximum quantity of times that msgA is transmitted in 2-step random access by the apparatus; and
sending, to a first network device, the first report for the first network device to optimize random access configuration information for the 2-step random access, wherein the first report including the information indicating the maximum quantity is received by the first network device in one of a user equipment (UE) information response message, a radio resource control (RRC) reconfiguration response message, or an RRC connection reconfiguration response message, and
wherein the first report further comprises second information, and the second information comprises at least one of: information about a physical uplink shared channel (PUSCH) configured for the apparatus for the 2-step random access or the random access configuration information for the 2-step random access.

12. The apparatus according to claim 11, wherein the first report further comprises third information, and the third information indicates a quality threshold used by the apparatus in determining whether to perform the 2-step random access.

13. The apparatus according to claim 11, wherein the first report further comprises fourth information, and the fourth information indicates time information when the apparatus falls back to 4-step random access from the 2-step random access.

14. The apparatus according to claim 11, wherein the first report further comprises fifth information, and the fifth information indicates cell information for the apparatus to perform the 2-step random access.

15. The apparatus according to claim 11, wherein the first report further comprises sixth information, and the sixth information indicates at least one of: a network type of a first cell, a frequency type of the first cell, a service type of the first cell, or a type of the first cell, and wherein the first cell is a cell in which the apparatus performs the 2-step random access.

16. The first apparatus according to claim 1, the performing comprising:

adjusting the maximum quantity of times to generate an updated maximum quantity of times that msgA is transmitted in the 2-step random access.

17. The first apparatus according to claim 1, wherein the random access configuration information for the 2-step random access comprises a time-frequency resource for sending a random access preamble, and wherein the second information further comprises a correspondence between the random access configuration information and the PUSCH.

18. The method according to claim 6, wherein the random access configuration information for the 2-step random access comprises a time-frequency resource for sending a random access preamble, and wherein the second information further comprises a correspondence between the random access configuration information and the PUSCH.

19. The apparatus according to claim 11, wherein the random access configuration information for the 2-step random access comprises a time-frequency resource for sending a random access preamble, and wherein the second information further comprises a correspondence between the random access configuration information and the PUSCH.

* * * * *